(12) United States Patent
Alexander et al.

(10) Patent No.: US 8,472,570 B2
(45) Date of Patent: Jun. 25, 2013

(54) METHOD AND SYSTEM FOR COMMUNICATION IN A WIRELESS NETWORK

(75) Inventors: Paul Dean Alexander, Prospect (AU); John Lawrence Buetefuer, Para Hills (AU); Ivan Anthony Curtis, Vale Park (AU); Wade Nicholas Farrell, Black Forest (AU); Alexander James Grant, North Adelaide (AU); David Victor Haley, Stepney (AU); Stephen Peter Jakas, Hillcrest (AU); Joshua Charles Sutton, Maylands (AU)

(73) Assignee: Cohda Wireless Pty Ltd., Kent Town, South Australia ( * ) Notice: Subject to any disclaimer, the term of this patent is extended or adjusted under 35 U.S.C. 154(b) by 0 days.

(21) Appl. No.: 13/356,679

(22) Filed: Jan. 24, 2012

(65) Prior Publication Data

US 2012/0120945 A1    May 17, 2012

Related U.S. Application Data

(62) Division of application No. 12/064,457, filed as application No. PCT/AU2006/001201 on Aug. 22, 2006, now Pat. No. 8,135,091.

(30) Foreign Application Priority Data

Aug. 22, 2005 (AU) ................................ 2005904528

(51) Int. Cl.
*H03D 1/00* (2006.01)

(52) U.S. Cl.
USPC ........... 375/343; 375/260; 375/267; 375/299; 375/347; 375/349; 375/350

(58) Field of Classification Search
USPC ................. 375/343, 260, 267, 299, 347, 349, 375/350
See application file for complete search history.

(56) References Cited

U.S. PATENT DOCUMENTS

| | | |
|---|---|---|
| 5,448,255 A | 9/1995 | Hulett et al. |
| 5,940,435 A | 8/1999 | Hendrickson |

(Continued)

FOREIGN PATENT DOCUMENTS

| | | |
|---|---|---|
| EP | 072698 A2 | 3/1997 |
| EP | 06774836.8 | 5/2011 |

(Continued)

OTHER PUBLICATIONS

Bulumulla et al.; An Adaptive Diversity Receiver for OFDM in Fading Channels; Proceedings of the 1998 IEEE International Conference on Communications (ICC98), vol. 3, pp. 1325-1329, Jun. 7-11, 1998.

(Continued)

*Primary Examiner* — Kabir A Timory
(74) *Attorney, Agent, or Firm* — Allen, Dyer, Doppelt, Milbrath & Gilchrist, P.A.

(57) ABSTRACT

The present application discloses a number of inventions directed to method(s), apparatus and/or networks and systems adapted to track time varying channels, adapted to synchronize packets arriving at a receiver, adapted to correlate a received signal, adapted to manage digital resources, adapted to receive a signal and/or adapted to enable communication in a wireless packet based communications network.

8 Claims, 19 Drawing Sheets

U.S. PATENT DOCUMENTS

| | | | |
|---|---|---|---|
| 6,661,771 | B1 | 12/2003 | Cupo et al. |
| 6,891,792 | B1 | 5/2005 | Cimini, Jr. et al. |
| 2003/0112743 | A1 | 6/2003 | You et al. |
| 2004/0087292 | A1 | 5/2004 | Shiu et al. |
| 2004/0160988 | A1* | 8/2004 | Boehlke et al. ............... 370/480 |
| 2004/0190650 | A1 | 9/2004 | Khorram et al. |
| 2004/0264561 | A1* | 12/2004 | Alexander et al. ............ 375/232 |
| 2005/0047384 | A1 | 3/2005 | Wax et al. |
| 2005/0063378 | A1* | 3/2005 | Kadous ........................ 370/389 |
| 2005/0075088 | A1 | 4/2005 | Ono et al. |
| 2005/0266904 | A1 | 12/2005 | Kitaji et al. |
| 2006/0285478 | A1* | 12/2006 | Gaikwad et al. ............... 370/203 |
| 2008/0139141 | A1* | 6/2008 | Varghese et al. ........... 455/114.3 |

FOREIGN PATENT DOCUMENTS

| | | |
|---|---|---|
| WO | WO 94/28661 A1 | 12/1994 |
| WO | WO 02/075942 A2 | 9/2002 |
| WO | WO 2005/011128 | 2/2005 |
| WO | WO 2005/025162 A1 | 3/2005 |

OTHER PUBLICATIONS

Balakrishman et al., Blind Adaptive Channel Shortening by Sum-Squared Autocorrelation Minimization (SAM), IEEE Transactions on Signal Processing, vol. 51, No. 12, pp. 3086-3093, Dec. 2003 <retrieved at http://bard.ece.cornell.edu/publications/ on May 24, 2005>.

Xiang et al.; A Software Radio Test Bed for Two-Transmitter Two Receiver Space-Time Coding OFDM Wireless LAN IEEE Radio Communications Magazine, vol. 42, No. 6, pp. 520-528, Jun. 2004 <retrieved at http://www.ece.gatech.edu/~wxudong/ on May 24, 2005>.

McNair et al.; Implementation of an Experimental 384 kb/s Radio Link for High-Speed Internet Access; Proceedings of the IEEE Vehicular Technology Conference (VTC 2000 Fall), vol. 1, pp. 323-330, Sep. 24-28, 2000; <retrieved at http://www.novidesic.com/papers on May 24, 2005>.

McNair et al.; A Robust Timing and Frequency Offset Estimation Scheme for Orthogonal Frequency Division Multiplexing (OFDM) Systems; Proceedings of the IEEE Vehicular Technology Conference (VTC 1999), vol. 1, pp. 690-694, May 16-20, 1999 <retrieved at http://www.novidesic.com/papers on May 24, 2005>.

Tell, E. et al.; A Low Area and Low Power Programmable Baseband Processor Architecture; Proceedings of the 9th Intern'l Database Engineering & Application Symposium (IDEAS '05) 1098-806805; 2005.

Tonello, A.M.; Asynchronous Multicarrier Multiple Access Optimal and Suboptimal Detection and Decoding; Bell Labs Tech Journal 7(3), 191-217 (2003); Wiley Periodicals, Inc., published online in Wiley Interscience (www.interscience.wiley.com; 2003.

Tonello, A.M.; A Time-Frequency Domain Approach to Synchronization, Channel Estimation and Detection for DS-CDMA lmpluse Radion Systems; IEEE Transactions on Wireless Communications; pp. 1-12, 2005.

Lorehzelle, F. et al.; Overview of Space-Time Processing and Coding for Wireless Applications; ST. Journal of System Research, vol. 1, No. 1, ST Microelectronics, 2003.

Vandebeek, J-J et al.; M L Estimation of Timing and Frequency Offset in Multicarrier Systems; Div. of Signal Processing Lulea Univ. of Technology, Sweden, Apr. 1996.

Lee, D. et al.; Coarse Symbol Synchronization Algorithms for OFDM Systems in Multipath Channels; IEEE Communications Letters, vol. 6, No. 10, pp. 446-448, Oct. 2002.

* cited by examiner

Figure 1
(Prior Art)
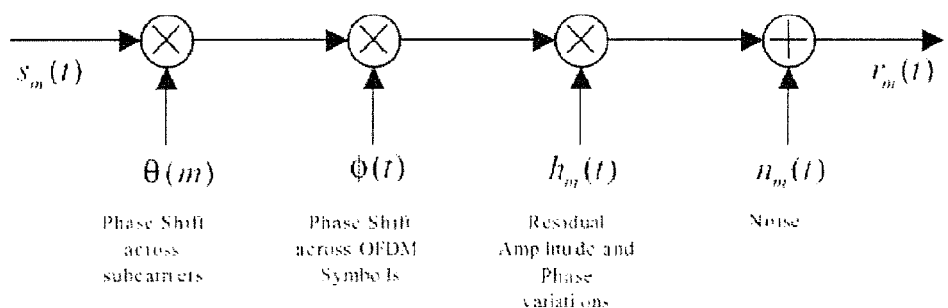
$s_m(t)$ → ⊗ → ⊗ → ⊗ → ⊕ → $r_m(t)$
θ(m)　　　φ(t)　　　$h_m(t)$　　　$n_m(t)$
Phase Shift　　Phase Shift　　Residual　　Noise
across　　　across OFDM　Amplitude and
subcarriers　　Symbols　　　Phase
　　　　　　　　　　　　variations
Figure 2
Indoor wireless channel (ETSI BRAN)
(Prior Art)
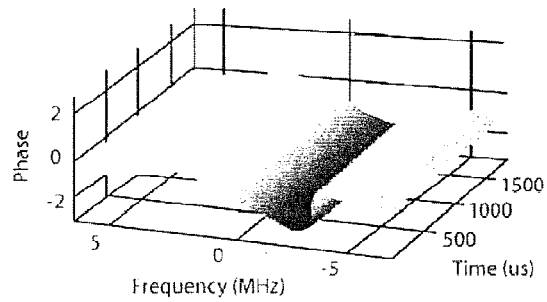
(a) Phase
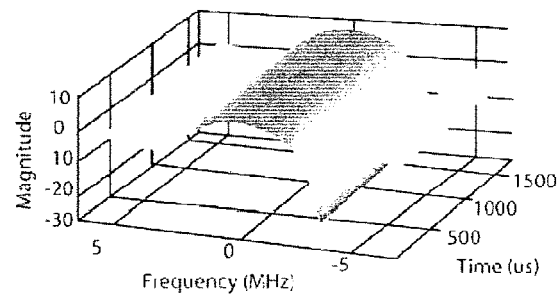
(b) Magnitude
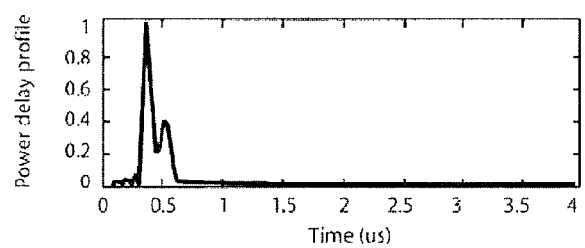
(c) Power delay profile OFDM symbol dimensions Conventional OFDM PHY system model Generalised OFDM PHY system model with multiple receive antennas 802.16a OFDM downlink pilot and preamble structure Packet error rate with conventional pilot assisted phase tracking Packet error rate with conventional pilot assisted channel tracking Packet error rate with accurate channel tracking

METHOD AND SYSTEM FOR COMMUNICATION IN A WIRELESS NETWORK

FIELD OF INVENTION

The present invention relates to the field of wireless communications such as may be utilised in computer networks. In one particular form the present invention relates to improved multiple access communications. In another particular form, the invention relates to an improved signal processing method and apparatus for a multiple access communication system. It will be convenient to hereinafter describe the invention in relation to the use of a multi user packet based wireless OFDM (Orthogonal Frequency Division Multiplexing) communication system, however, it should be appreciated that the present invention may not be limited to that use, only.

RELATED ART

The discussion throughout this specification comes about due to the realisation of the inventor and/or the identification of certain prior art problems by the inventor.

Throughout this specification the use of the word "inventor" in singular form may be taken as reference to one (singular) or more (plural) inventors of the present invention.

The inventor has identified the following related art.

In Applicant's co-pending International (PCT) Applications, PCT/AU03/00502 and PCT/2004/001036 both published under WIPO publication Numbers WO 03/094037 and WO 2005/11128 (respectively), a number of background art systems have been identified relating in particular to wireless communications systems based on so-called multiple access techniques in which, information such as voice and data are communicated. The specification of WO 03/094037 and WO 2005/11128 are incorporated herein by reference in their entirety.

The inventor has recognised that the performance of a Mobile Communications System may be heavily dependent on the quality of the Physical Layer (PHY) processing. The PHY may provide for delivering coverage and robustness to radio links between nodes that move through hostile propagation conditions such as urban canyons, and areas of high interference. Mobility, and in particular high speed terrestrial mobility, may induce yet another set of difficulties for the PHY as the reflections off the surrounding buildings, vehicles and other bodies may combine in a time varying manner. In the case of a Private Mobile Radio (PMR) network, sensitivity to cost and lower densities of users may often be seen relative to complex and expensive 2G and 3G Cellular networks. Multi-hopping wireless networks are emerging as a network topology of choice for PMR, since they may provide inexpensive and flexible broadband communications. The flexibility may be afforded by the self forming nature of the network and the small form factor of the network nodes.

Some wireless multi-hopping network vendors have rolled legacy IEEE 802.11 radio technologies into their systems. 802.11 radios may be considered as designed for stationary indoor propagation environments and their use in outdoor mobile communications networks may be ill founded from a technical perspective. Standardization efforts within the IEEE 802.16e and 802.20 Physical Layer working groups may be considered as focused on providing a waveform for transmission that is compatible with the communications challenges faced while travelling outdoors at speed. Standards typically do not specify how to receive signals, rather focussing on what signals should be transmitted. The vendors are then responsible for the receiver technology. Getting the PHY right in wireless multi-hopping networks may be especially important since local access and a degree of backhaul are provided wirelessly.

The inventor considers that the problems of delivering reliable high speed access to mobile users may be exemplified in Private Mobile Radio (PMR) networks, such as those employed by Public Safety end users. The technology that may be currently employed in PMR networks, such as TETRA and GPRS, is considered to be struggling to meet user demand. The inventor recognises a strong market pull for reliable mobile broadband access, in order to meet the requirements of applications such as remote databases and the delivery of real-time video. Third generation (3G) mobile systems may be considered as an alternative, as they offer increased throughput and reliability. However, such networks were designed primarily with circuit switched voice communications in mind. In contrast, modern applications often call for high speed packet data transfer. The heavy infrastructure and licensing costs of 3G networks may also make them less attractive as an alternative.

It has recently been proposed that wireless multi-hopping packet data networks be used for PMR deployment. In contrast to the 3G model, which relies on a base station topology, the topology of the multi-hopping solution may comprise several small wireless nodes. These nodes may form a network through which data packets are passed from a sender to a single receiver, or broadcast to multiple receivers simultaneously. Such a network may be able to reconfigure dynamically when nodes enter or exit the system, making them attractive for applications which allow mobile users. Moreover, if a single node fails then the network may remain operational, which stands in contrast to an expected catastrophic failure of a base station. With the multi-hopping network model in mind, there becomes a clear requirement for a wireless modem which is able to offer reliable broadband access, while mobile, in, for example, an urban environment. The inventor considers that Orthogonal Frequency Division Multiplexing (OFDM) is well suited to broadband wireless communications. However, this technique may have been historically applied to the problem of transmitting data in a stationary indoor environment. The outdoor urban environment may contain many obstacles for the radio signal, such as buildings and trees, which are referred to as clutter. Present wireless technology may be able to offer high throughput only at the expense of receiver sensitivity, hence the cluttered urban environment may lead to poor coverage. Furthermore, the relative mobility between the transmitter and receiver may cause the impact of these obstacles to change in time. When the effects of mobility and clutter combine, the resulting wireless channel may present a significant challenge to the communications system designer.

With further reference to related art identified by the inventor, attaining mobility and receiver sensitivity requires high quality tracking of parameters necessary for improved demodulation. There are parameters which are considered important for the estimation of the radio channel leading to accurate demodulation increasing the sensitivity of the receiver. In OFDM systems the frequency domain channel model required for the demodulation of the received signal is predominately characterised by the following six parameters.

1/Complex Channel Amplitude (per subcarrier)
2/Phase offset per OFDM symbol
3/Noise Power
4/OFDM timing error/offset
5/Channel Coherence time
6/Channel Coherence frequency The complex channel amplitude may be modelled as the combination of three effects, for example, 1, 2, 4, as above. The complex channel amplitude variation may correspondingly be modelled excluding phase and OFDM timing offsets. For OFDM subcarrier m the frequency domain received signal may be expressed in terms of the frequency domain transmitted signal as follows in Eqn 1:

$$r_m(t) = \theta(m)\phi(t)h_m(t)s_m(t) + n(t) \quad \text{Eqn 1}$$

With reference to FIG. 1, which shows the circuit equivalent of Eqn 1, the signal transmitted on subcarrier m, $s_m(t)$, is impacted by three effects represented as multiplication by complex numbers. Without any particular relevance to their order, the first of these effects $\theta(m)$ represents the slowly varying phase shift across subcarriers in an OFDM symbol induced by FFT (Fast Fourier Transform) window timing offsets. In terms of modelling a packet channel model it may be assumed the phase shift across subcarriers is invariant with time across OFDM symbols. The second effect $\phi(t)$ is the slowly varying phase shift across OFDM symbols. This phase shift is assumed identical for all subcarriers and models effects such as frequency offsets between the transmitter and receiver RF stages and phase noise. A third effect $h_m(t)$ collects the higher rate phase and amplitude variations such as those induced by frequency selective fading and mobility where the Doppler frequency is a significant fraction of the OFDM symbol rate. This third multiplicative value may vary with time and subcarrier.

Each of the above parameters may either change rapidly with time and/or frequency and/or are very important for accurate demodulation of the received signal. The inventor has identified that those conventional approaches to tracking these parameters typically:

Apply algorithms/techniques designed for stationery environments, and thus there has not been provision for updating parameters.

Ignore the issue, or

Use inefficient techniques, such as pilots, which limit data throughput. Also they are limited in the rate of change, in the time and/or frequency domain, of the parameters that can be sustained.

Generally, it is considered that there is a need in which increased data rates requires lower latency decoding. Furthermore, it is considered there is high complexity of multi-antenna demodulation in this environment.

The complexity of the determination of the time of arrival of a packet should be kept low in practical systems since the process is running continuously. Accordingly, inaccuracies in the time of arrival should be accounted for in subsequent processing stages so it is desirable that the accuracy of this stage be as high as possible while minimising complexity. Conventional systems may employ a delay and correlate method where the received signal is multiplied by a delayed version of itself and accumulated and normalised, forming a metric. A packet arrival time may then be determined from any peak in the normalised metric above a predetermined threshold. Normalisation of the input signal is ordinarily required and is subject to large fluctuations in received signals experienced in outdoor wireless communications.

Signals with similar properties to the preamble of a desired packet eg, Carrier Wave Jammers and DC Offset effects may impact the conventional systems resulting in unacceptable levels of performance in some cases. False acquisitions may lead to wasted receiver processing resources and eventually leading to reduced throughput, and therefore should also be minimised, again while keeping complexity low.

Delay and Correlate algorithms may ordinarily employ a peak search to determine the timing instant. When these algorithms are implemented in low complexity binary signal processors there may be several timing instants with the same maximum value. This may cause uncertainty in the timing instant.

Fine Time synchronisation may be required in receivers that implement coherent demodulation. Typically a known preamble is transmitted enabling the receiver to correlate for the known sequence in the received signal. Correlation can be expensive when the correlation length is long since each sample accumulated requires a complex multiplying step. This problem may be exacerbated when multiple antennae are employed to receive the signal since the correlation may be implemented for each antenna. If M antenna are used the complexity is M-fold.

The timing instant or, arrival time is found by determining the peak of the correlation powers across a set of correlations differentiated by a timing offset. In the case that it is desired to terminate packet processing based on fine timing metric quality a threshold must be defined. However, thresholds are subject to signal variations and it can be difficult to set an appropriate threshold.

Signals transmitted across the wireless media may be subject to frequency selective fading. Different levels of interference may also exist on difference frequencies.

Ordinarily, in OFDM wireless communication systems a redundant cyclic prefix may be employed to mitigate the effects of multipath delay spread on a signal. Consequently, pulse shaping at the transmission and receiving sides of the communication further contributes to spreading the communicated signals on top of the spreading caused by multipath propagation.

Remote digital resources that form part of and assist in distributed computing and communication systems such as multi access networks may suffer from limited resourcing in their own right given the demands now placed on such systems. For example, there may be limited computing & memory resources available for embedded systems. Such digital resources may comprise entities either software or hardware for Debugging & Development of a complex system consisting of multiple devices such as for example, digital signal processors (DSPs) and field programmable gate arrays (FPGAs).

In wireless communications systems the received signal power may fluctuate beyond the dynamic range supported with Analogue to Digital Conversion devices by up to several orders of magnitude. With reference to FIG. 25A, in conventional systems, this problem may be solved by placing a variable gain amplifier (VGA) in the Radio Frequency receive path between the receive antenna and the ADC circuits. Digital control systems typically control the gain of the VGA by sensing the received signal strength provided as RSSI data in conventional RF devices.

Conventional automatic gain control (AGC) algorithms are threshold based where a change in the VGA gain is only made if the received signal power exceeds a first predetermined threshold, $Th_1$. Thereafter, it may be possible for a second threshold, $Th_2$, to be set as a trigger point for the VGA. $Th_2$ may differ from $Th_1$ by $\Delta Th$ as shown. If there is no threshold exceeded (see $Th_3$), such as in the case of a weak but still fluctuating signal, then the VGA gain settings do not change. The inventor recognises that, as noted below, unfortunately the threshold determines receiver sensitivity. Therefore, receiver sensitivity is a very important performance criterion and should not be compromised if possible. For example, if the threshold is set too low conventional systems trigger and unnecessary state changes result which locks the receiver out. Further, in some RF devices a gain change may mean that the receive path is unstable for a significant time period.

Many wireless communication systems may employ direct-conversion RF receiver devices, where the RF signal is mixed down to DC, into it's baseband equivalent in-phase (I) and quadrature (Q) signals. In such a device the receive baseband signals may experience significant DC offset due to various processes internal to the RF receiver device. In such devices, a wide high-pass filter (WHPF) may be present that can be enabled to remove this DC offset so that baseband signal power measurement can be performed. However the width of the filter may be such that it filters away a significant portion of the centre of the received signal, making its use unsuitable when a valid burst is present on the channel.

It is typically recommended that when not receiving a signal, the RF receiver be operated in this WHPF mode, and that once a signal is detected (typically by separate RF signal power measure exceeding some threshold) the WHPF is switched off, returning the device to the DC-coupled mode. This change of mode may induce large DC offsets in the I and Q baseband signals. Operating the modem and receiver in this way may also result in significant distortion at the start of a received burst, and if the signal power is very low (in the case of weak signals) potentially for the entire burst.

Conventional automatic gain control (AGC) algorithms may be threshold based where a change in the RF device gain, and more significantly, disabling the WHPF mode, is only made if the received signal power exceeds a predetermined threshold. If the signal power is very low (as in the case of weak signals) the threshold may not be exceeded, leaving the WHPF mode active for the duration of the packet. This may be undesirable as the resulting distortion may further degrade the possibility of reliably detecting and demodulating the packet successfully. The inventor recognises that in this case, unfortunately, the threshold determines receiver sensitivity rather than other aspects of the synchronisation and demodulation process. If the threshold is set too low, conventional systems may trigger on noise and unnecessary state changes may result which also distort the receive baseband signal. Further, in some RF devices a gain change may mean that the receive path is unstable for a significant time period. Accordingly, the inventor has recognised that receiver sensitivity is a very important performance criterion and should not be compromised, if possible.

Any discussion of documents, devices, acts or knowledge in this specification, either within the text of this specification or, material incorporated herein by reference is included to explain the context of the invention. It should not be taken as an admission that any of the material forms a part of the prior art base or the common general knowledge in the relevant art in Australia, the United States of America or elsewhere on or before the priority date of the disclosure and claims herein.

SUMMARY OF INVENTION

It is an object of the present invention to overcome or mitigate at least one of the disadvantages of related art systems.

In one aspect of invention, a method of tracking time varying channels in a wireless packet based communication network is provided comprising the steps of tracking at least one channel parameter in the time domain in accordance with an auto regression algorithm.

In another aspect of the invention, a method of tracking time varying channels in a wireless packet based communication network is provided comprising the steps of tracking at least one channel parameter in the time domain in accordance with an auto regression algorithm. Preferably, the method also removes the effect of this parameter on the received signal and then estimates at least one second channel parameter with an auto regression algorithm.

In another aspect of invention, a method of tracking time varying channels in a wireless packet based communication network is provided comprising the steps of providing a CEDB update function and a FEC decode function in accordance with a pipeline processing algorithm.

In a further aspect of invention, a method of synchronizing packets arriving at a receiver in a wireless communication network is provided, in which the method comprises the steps of receiving a sampled packet input signal; determining a complex representation of the sampled input signal, and performing a delay and correlate calculation to form a first decision metric for a packet arrival time such that the correlation comprises a first arithmetic operation.

In a still further aspect of invention, a method of synchronizing packets arriving at a receiver in a wireless communication network is provided, the method comprising the steps of performing a first and a second calculation in accordance with a method as disclosed herein, and determining a difference between the first and second calculations to form a second decision metric for a packet arrival time.

In yet another aspect of invention, a method of synchronizing packets arriving at a receiver in a wireless communication network is provided comprising the steps of accumulating a set of decision metrics in accordance with a method as disclosed herein such that each decision metric of the accumulated set exceeds a predetermined threshold value, determining the earliest and latest decision metrics that are equal to a maximum value, and determining a packet arrival time corresponding to the midpoint between the earliest and latest decision metrics.

In a still further aspect of invention, a method of correlating a received signal in a wireless packet based communication network is provided comprising the steps of quantising at least a first and a second signal component such that the signal components are represented by a first and second one bit reference, respectively, and performing correlation operations on the first and second one bit references.

A further aspect of invention provides a method of communicating in a wireless packet based communication network comprising the steps of mixing a signal for transmission on the network into at least two distinct frequency bands so as to provide at least two transmission frequencies for the one signal.

A further aspect of invention provides a method of communication in a wireless OFDM multiple access packet based communication network comprising the step of providing a redundant cyclic data field for a transmitted data packet wherein the data field is a non-contiguous string distributed about a data packet.

A further aspect of invention provides a method of managing digital data processing resources comprising the steps of providing an interpretive shell for communicating between an embedded system device and a remote PC wherein the interpretive shell reads user input data and interprets said user input data in the context of a programming language so as to interface digital instructions between the embedded system device and the remote PC to enable the remote PC to delegate a portion of the PC computing resources to the functions of the embedded system device.

A further aspect of invention provides a method of receiving a signal transmitted in a wireless packet based communication network, the method comprising the steps of operating a receiver in a first mode, monitoring received signal characteristics to determine whether the signal characteristics exceed a predetermined threshold condition, and switching the receiver to a second mode if the predetermined threshold condition is exceeded.

A further aspect of invention provides a method of receiving a signal transmitted in a multiple access packet based communication network, the method comprising the steps of operating a RF receiver device in a substantially DC coupled mode, tracking baseband DC offsets in the received signal, and initiating at least one DC offset removal strategy if the magnitude of DC offset exceeds a predetermined threshold.

Still further aspects of invention relate to apparatus and/or communications networks which are herein disclosed.

Further aspects and preferred aspects are disclosed in the specification and/or defined in the appended claims, forming a part of the description of the invention.

The suite of Physical Layer techniques stemming from the present invention may be utilised for delivering the link robustness and sensitivity required for wireless multi-hopping radio networks. In embodiments of the present invention, these techniques may include:

State of the art forward error correction coding, e.g. Turbo codes;

Effective exploitation of space diversity through the use of multiple antennas;

Effective exploitation of time diversity, being readily afforded through OFDM;

Accurate tracking of the radio channel between nodes as they move at speed throughout a cluttered coverage area.

The last point may be particularly difficult to achieve without significantly diluting the transmitted signals, by replacing a proportion of useable data symbols with wasteful pilot symbols, e.g. in accordance with IEEE 802.16e. This may be also of interest to the likes of Public Safety end users.

The present invention provides a number of advantages and benefits such as but not limited to the following:

A 10 dB gain in receiver sensitivity and;

effective packet throughput provided beyond 200 mph.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, improvements, advantages, features and aspects of the present invention may be better understood by those skilled in the relevant art by reference to the following description of preferred embodiments taken in conjunction with the accompanying drawings, which are given by way of illustration only, and thus are not limiting to the scope of the present invention, and in which:

FIG. 1 is a representation of a frequency domain received OFDM signal;

FIG. 2 illustrates a model of an indoor wireless channel;

DETAILED DESCRIPTION

Figure 3:
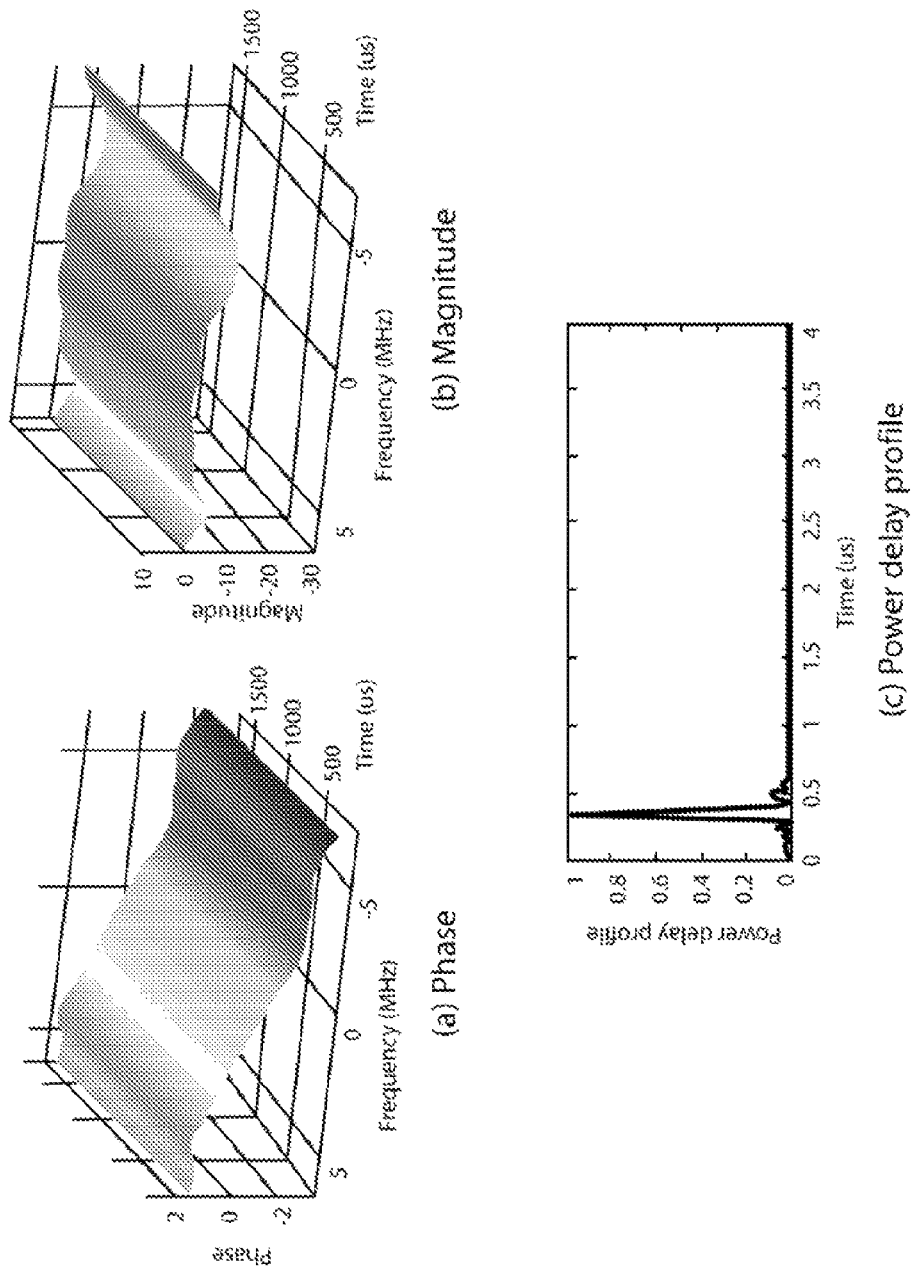
FIG. 3 illustrates a model of an outdoor stationary wireless channel in near line-of-sight conditions.

To provide an understanding of embodiments of the present invention, a wireless channel model is presented for several combinations of clutter and mobility. In order to represent mobile communication in a realistic urban environment, a model is provided which combines heavy clutter and high mobility, and this model is supported empirically. An introduction to current Physical Layer technology and OFDM based standards is presented, and common approaches which are used to estimate the channel characteristics are discussed. The inventor considers that it is expected that such techniques will perform satisfactorily in the presence of either clutter or mobility but not in the presence of both. These expectations have been supported empirically through simulation. These expected drawbacks have motivated the inventor in the use of the advanced channel estimation and tracking algorithms described hereafter. A case study is first presented herein which compares the present invention and its application to Physical Layer technology to that of a state-of-the-art wireless chipset.

The Mobile Broadband Radio Channel

A common technique for transmitting information is to map it onto the magnitude and/or phase of a radio signal. One of the key difficulties in the design of outdoor mobile communications systems is the impact of the propagation environment, ie channel, on the radio signal. The channel may distort the transmitted signal by altering its magnitude and/or phase, potentially resulting in the loss of information. In the case of line-of-sight (LOS) transmission, the signal path between the transmitter and receiver may be free of physical obstacles. Moreover, there may be a limit to the proximity of clutter surrounding the path and thus only a limited amount of signal reflection. In contrast, as the signal travels through clutter in a non line-of-sight (NLOS) link it may be attenuated or diffracted. Reflections of the signal may also come from the surrounding clutter, thus resulting in several signals being superimposed and arriving at the receiver at the same time. In this multipath case, each component of the sum may have experienced a different path delay and effects on magnitude and phase. Such characteristics of the wireless channel are further described in [1].

Wireless channels associated with several physical environments are now described and the effects arising from mobility and the presence of clutter are illustrated. The channel effects that are described result from the physical environment and/or relative motion between the transmitter and receiver. Effects arising from noise, and interference from other devices, are ignored in this discussion. Such effects propose a further challenge to the system designer. However, it is important to note that the wireless channel alone has the potential to significantly distort the radio signal, even in the absence of noise and interfering equipment.

The Indoor Stationary Environment

Consider the case where two stationary devices communicate over a limited range in an indoor environment, such as a Wireless Local Area Network (WLAN). The radio signal may be required to penetrate walls and hence suffer shadow fading as a result. Indoor clutter may also result in signal reflections and hence multipath effects. When the reflected signals combine in a de-constructive manner, the result may be multipath fading. An example of the indoor stationary channel, which is based on the ETSI BRAN model [2], is shown in FIG. 2. The effect that the channel may have on signal phase and magnitude are illustrated in FIGS. 2a and 2b, respectively. The plots show how the channel effects vary across the frequency spectrum, and in the time domain. In this example the physical environment is assumed to be fixed and hence the channel properties do not alter over time. The power delay profile (PDP) for the channel, shown in FIG. 2c describes how multipath components contribute to the received signal. The PDP associates a level of intensity to each delayed multipath component, representing its weighted contribution to the overall sum. The channel may be further characterized by its delay spread, which is a single value derived from the PDP. The delay spread accounts for all of the delayed multipath components according to their associated weights. A higher delay spread indicates that the channel is likely to have a stronger affect on the signal.

The coherence bandwidth of the channel may be approximated by the inverse of its delay spread. Frequencies in the spectrum which are separated by more than the coherence bandwidth are considered to be approximately independent. Conversely, frequencies separated by less than the coherence bandwidth exhibit similar fading profiles. It is therefore possible for a wideband signal to be subjected to fading in only an isolated section of the spectrum. In this example, such frequency selective fading may be observed approximately 3 MHz from the centre of the spectrum. A resultant deep fade in the magnitude and distortion of the phase profile are shown in FIGS. 2b and 2a, respectively. This indoor channel has a short delay spread, and hence high coherence bandwidth. Thus only one dominant deep fade is observed, in combination with some shallow fading.

The Outdoor Stationary Environment in Near LOS

In this section the outdoor wireless channel is investigated under the assumption of a stationary physical environment in near line of sight conditions. The IEEE 802.20 Modified Pedestrian-A (Case-I) model is employed for this purpose [3]. Such a channel may exist when directional antennas are used to connect separate buildings via a wireless link or when little clutter is present in the environment. The power delay profile for this wireless channel is shown in FIG. 3c. Several multipath contributions are provided from reflection, as the channel is not entirely LOS. However, each has only a small influence in comparison to the dominant LOS path. Hence the delay spread for this model is relatively short. The phase and magnitude characteristics of this channel are shown in FIGS. 3a and 3b, respectively. As a result of the short delay spread, and hence high coherence bandwidth, only a limited amount of frequency selective fading occurs. Moreover, the fading may be shallow, and distortion to the phase profile is light, due to the relatively small multipath contributions in the PDP. The stationary physical environment results in a time invariant channel.

The Outdoor Mobile Environment in Near LOS

Figure 4:
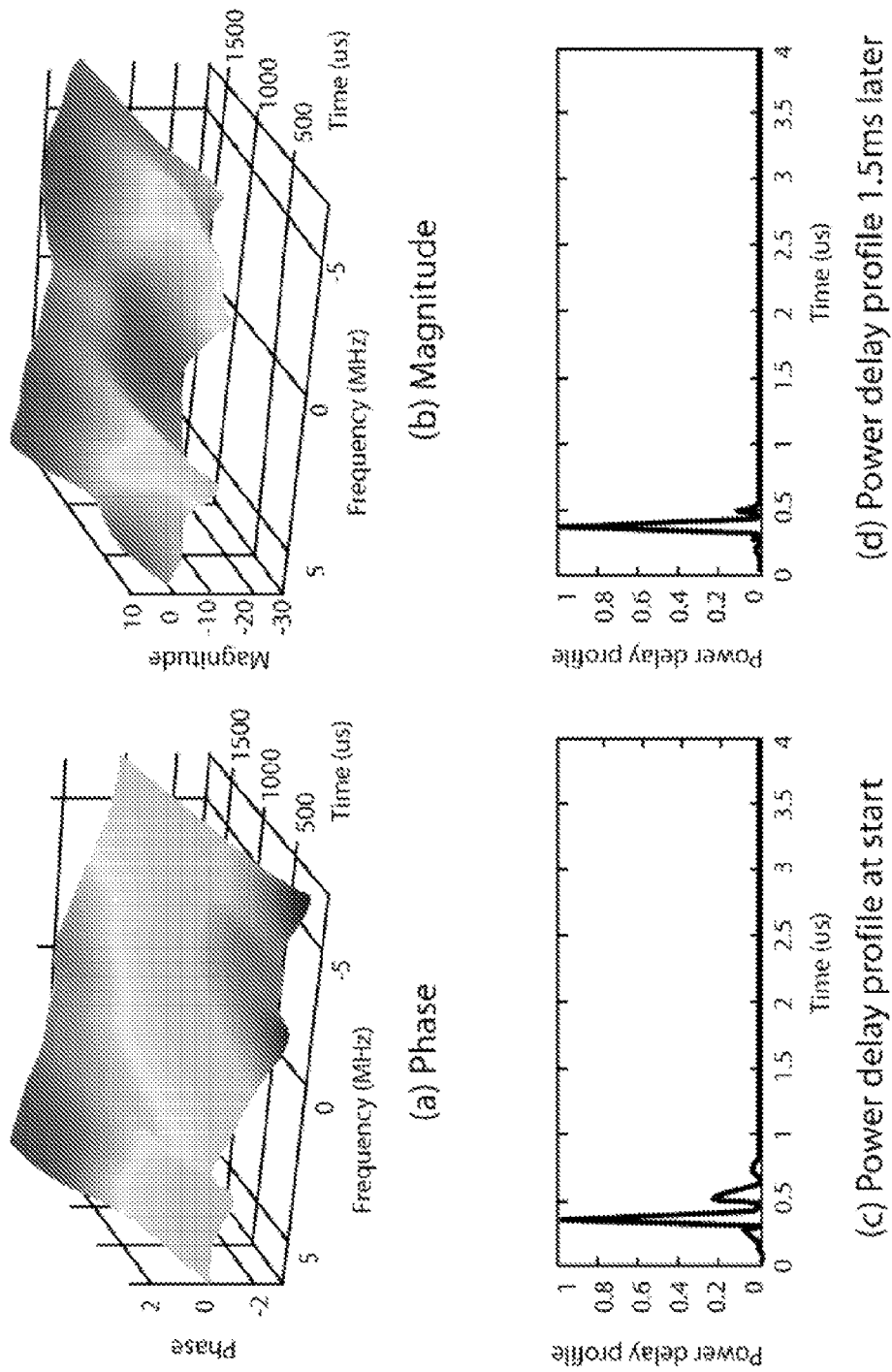
FIG. 4 illustrates a model of an outdoor mobile wireless channel in near line-of-sight conditions at 70 mph.

Consider the case when a wireless channel is employed between mobile and fixed devices, under near LOS conditions. For example, the fixed route taken by a train offers the potential for a LOS connection between a device on board the train and fixed wireless routers mounted at intervals along its path. In this instance, the IEEE 802.20 Modified Pedestrian-A (Case-I) model is employed, at a velocity of 70 mph [3]. The relative motion between the two devices causes the channel characteristic to change over time, as shown in FIG. 4. As for the case of the stationary channel described above, the power delay profile is dominated by the LOS component. However, here the dynamic physical environment causes shadowing and multipath contributions to vary randomly with time, and hence the PDP is also dynamic. As an example, the PDP is shown for the start and end of the time frame, in FIGS. 4c and 4d, respectively. The limited intensity of the multipath contribution results in some shallow frequency selective fading. The frequencies at which fading occurs vary as the PDP changes in time, as shown in FIG. 4b.

Distortion of phase across the frequency domain is also time varying, as shown in FIG. 4a. However, the low intensity multipath contributions again lead only to a mild effect. A further effect on the phase profile over time is provided by the Doppler shift, which arises from the relative motion between the transmitter and receiver. However, in LOS the Doppler induced phase shift, which occurs over time, is similar for all frequencies in the spectrum. This stands in contrast to the random frequency selectivity of the phase distortion which may arise from NLOS multipath effects.

The Outdoor Stationary Environment in NLOS

Figure 5:
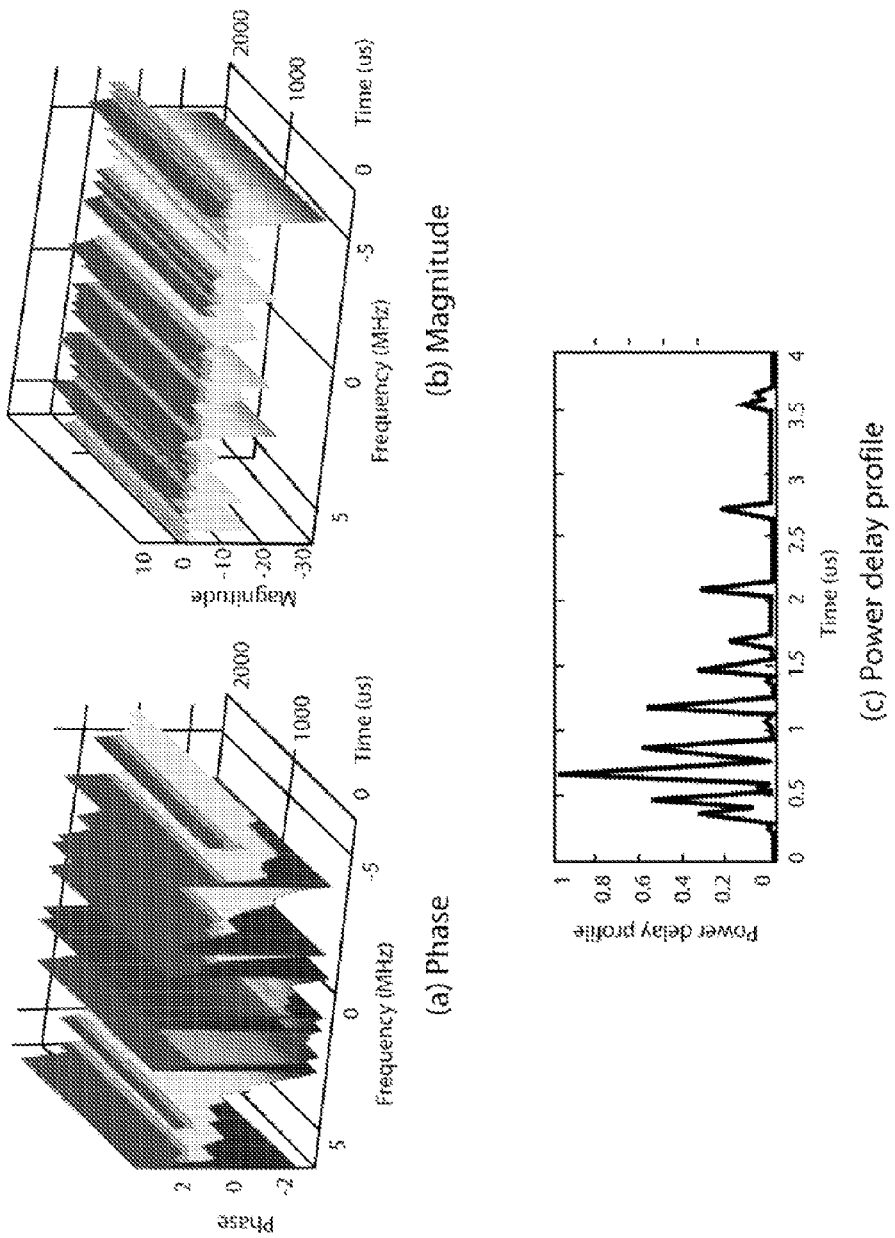
FIG. 5 illustrates a model of an outdoor stationary wireless channel in near line-of-sight conditions.

In this instance an example is provided for an outdoor channel model under the assumption of a stationary physical environment in non line of sight conditions. The IEEE 802.20 Typical Urban (Case-IV) model is employed for this purpose [3]. Such a channel may exist when separate buildings or stationary vehicles are connected through a environment which is cluttered with trees and other buildings. The power delay profile for this wireless channel is shown in FIG. 5c. In comparison to the near LOS case, many multipath contributions may be provided from reflection. In a cluttered urban environment, the reflected signals are strong, and hence each multipath contributor has a much greater influence. This results in the channel having a longer delay spread than those described above.

The inverse relationship between delay spread and coherence bandwidth indicates that wireless channels which have longer delay spreads are more likely to exhibit multiple instances of frequency selective fading. Moreover, in this channel the strong relative multipath contributions are likely to result in deep fading. Hence, this channel exhibits several instances of deep frequency selective fading and phase distortion, as shown in FIGS. 3b and 3a, respectively. As the physical environment is assumed to be fixed, the channel characteristic may not vary over time.

The Outdoor Mobile Environment in NLOS

In this instance a model is presented for the mobile wireless channel when operating in non line of sight conditions. Vehicles may travel at high speed through the urban environment, and in contrast to the link requirements of a train, they may not be assumed to follow a predetermined LOS admitting path. This example, in contrast to those presented earlier, models the effective combination of mobility and environmental clutter. It is this combination which makes the task of delivering broadband connectivity in a mobile urban environment significantly more challenging than doing so in any of the environments presented above.

Figure 6:
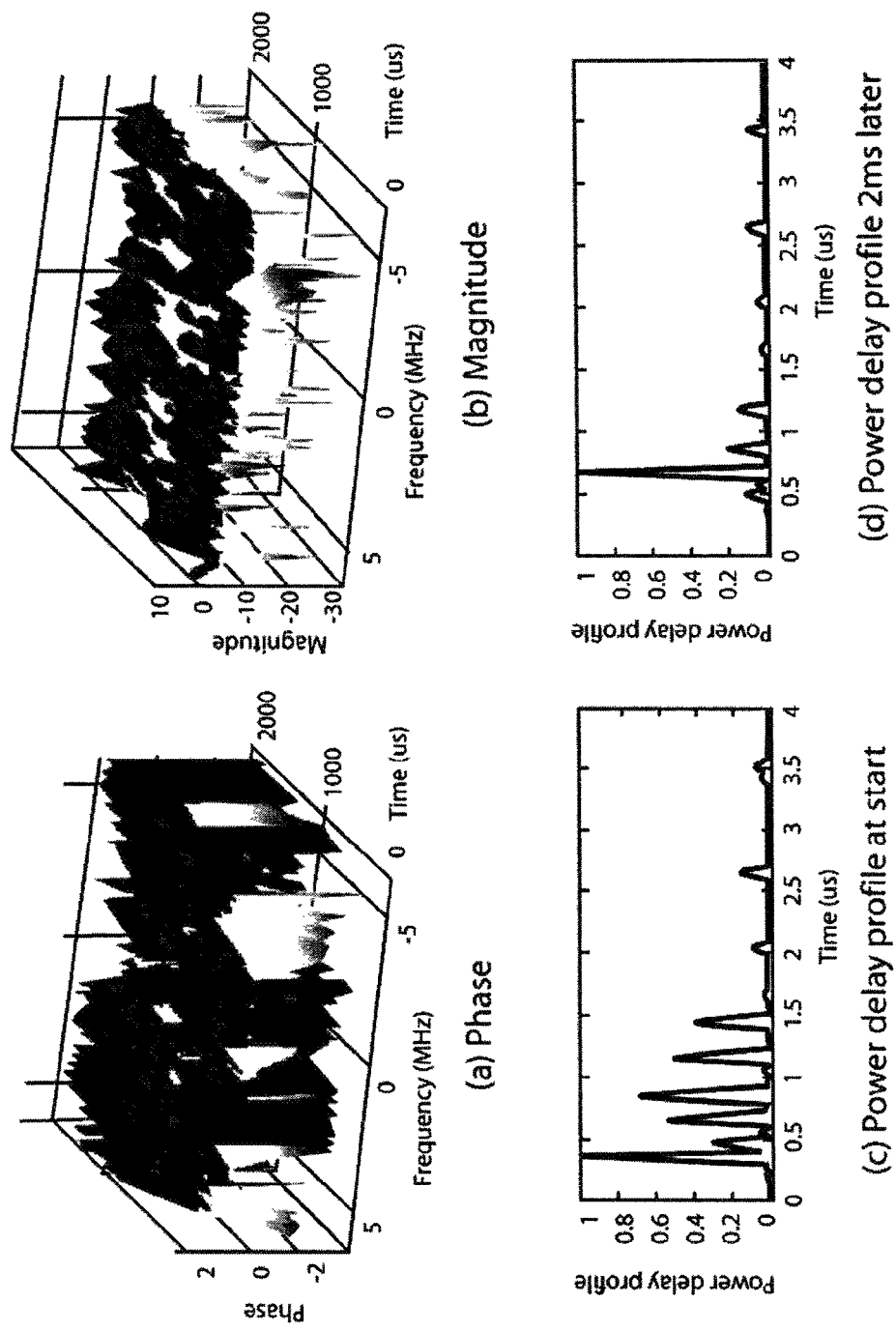
FIG. 6 illustrates a model of an outdoor mobile wireless channel in near line-of-sight conditions at 135 mph.

In this example the IEEE 802.20 Typical Urban (Case IV) model is employed, at a velocity of 135 mph [3]. The characteristics of this channel are shown in FIG. 6. The channel model combines the effect of a dynamic PDP and Doppler induced phase shift, described for the case of the near LOS mobile channel, with the long delay spread and strong multipath contributions of the stationary NLOS channel. The result is heavy phase distortion and closely spaced deep frequency selective fading, both of which also vary over time, as shown in FIGS. 6a and 6b, respectively. Due to the harsh, and highly dynamic nature of the NLOS mobile channel, the task of building mobile communication devices for use in NLOS environments may be significantly more complex than doing so for mobile LOS or fixed NLOS environments. Moreover, equipment which has been designed for use in these other environments may be unlikely to perform well at high mobility in a true urban environment.

Measured Wireless Channels

In order to validate the models employed above, field measurements have been taken. The vehicle speed for these captures was approximately 60~mph, with a carrier frequency of 2.4~GHz, resulting in a coherence time of a few milliseconds. Channels with many different delay spreads were discovered, and a selection are presented here. The captured channels are shown in FIGS. 7a and 7b. FIG. 7a resembles the 802.20 Case-I model and FIG. 7b resembles the 802.20 Case-III model [3]. Change in magnitude with time is evident in both cases.

Prerequisite Technologies

The current state-of-the-art, considered by the inventor, for bandwidth efficient, highly sensitive Physical Layer systems in hostile mobile radio environments may embody several specific techniques. Naturally, there is more to the system than just the Physical Layer. Advances in the Network Protocol, Medium Access Control (MAC) and Application Layer areas are also leading to end user benefits. Nonetheless, the key Physical Layer technologies in the state-of-the-art may include advanced forward error correction (FEC) coding and effective use of space and time diversity. Frequency diversity may be considered a common aspect of most modern day communications systems and is not given special mention here.

Powerful FEC

The advent of iterative decoding algorithms for powerful error correcting codes has resulted in link performance approaching the theoretical limits [4]. Turbo (iteratively decoded) codes of various types may now be found in most Physical Layer standards for broadband digital communications systems. These encoder and decoder algorithms may typically add several dB to the link margin, leading to greater range and/or data rate. The iterative nature of decoding algorithms for these codes may also offer some opportunities, in terms of receiver processing, that were not available a few years ago.

Time Diversity Exploitation

As discussed above, radio channels may induce a time dispersion of the transmitted signal. These delayed versions of the signal may be considered to be interference. However, they may contain information and therefore must be collected by the receiver in an effective manner. Typically a RAKE receiver (for CDMA) or a cyclic prefix (for OFDM) [1], is employed to recover as much energy as possible from the compromised received signal.

The cyclic prefix technique employed for OFDM may collect all of the multipaths that have a delay less than the cyclic prefix duration, and is very simple. At the transmitter a small section of each OFDM symbol is prepended to the symbol prior to transmission. At the receiver, this cyclic prefix is discarded, with all of the multipath being collected optimally in the remainder of the signal. However, since the cyclic prefix is discarded at the receiver, an energy per bit penalty may be incurred (often of the order of −1 dB). This technique does not require any form of channel estimation. For CDMA, the RAKE receiver may require channel estimation, and not all of the multipaths can be collected, since complexity grows linearly with the number of paths collected. Moreover, in mobile applications the RAKE coefficients must be tracked with time.

Space Diversity Exploitation

Figure 8:
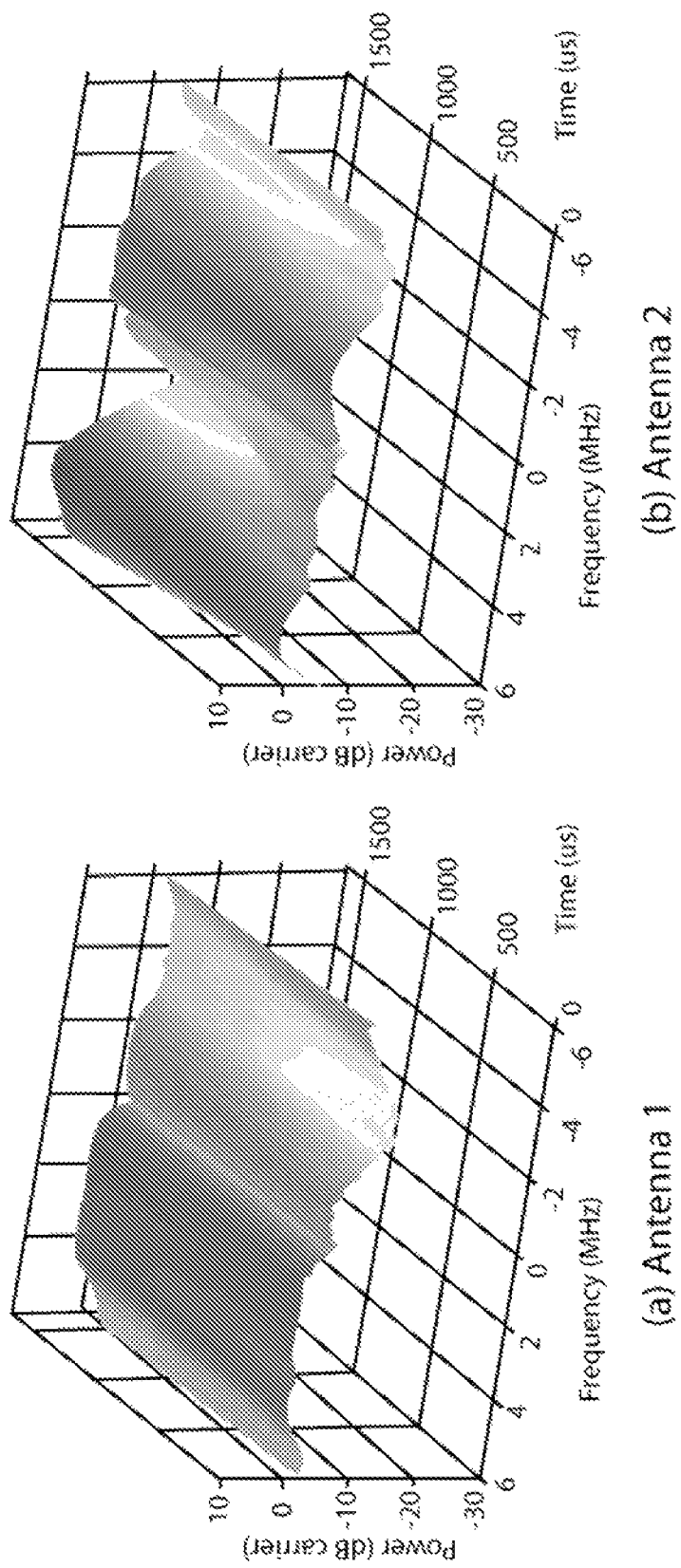
FIG. 8 illustrates channel measurements for a single transmit and two antenna receivers 1 m apart.

The radio channel between a pair of antennas differs depending on their relative location. It follows that by equipping the transmitter and/or the receiver with multiple antennas many different radio channels may result. The basic idea of spatial diversity is to exploit the fact that when one of the channels may be "bad", others may be "good". The channels between a single transmit antenna and two receive antennas were measured, and are shown in FIG. 8. The antennas were 1 meter apart and the wavelength was 2.46 GHz. For this short delay spread case there may be a significant fade for Antenna 2 that does not exist for Antenna 1. Receivers that exploit this difference between the signals may provide significant performance improvements, such as increased sensitivity, diversity against fading (especially important in a highly mobile situation) and interference rejection. A simple technique that is often employed in low cost commercial equipment is selection diversity. The antenna with the "best" signal is selected and only that signal is passed on to further digital signal processing. The signal on the other antenna is discarded. There are several problems with this technique in mobile applications. Firstly, due to changes in the power with time, the best antenna may change over the course of the packet. The receiver may decide that Antenna 2 is best at the start of the packet, then use that antenna to decode the entire packet. In mobile radio environments Antenna 2 may fade during the course of the packet. Secondly, when only one of the antennas is employed in subsequent processing, the ability of the receiver to reject interference may be compromised, relative to the case where all antennas are employed.

Candidate Physical Layers

The Physical Layer processing in wireless communications systems may be responsible for delivering some of the key system performance indicators. Link robustness, range, and support for mobility are all established by the Physical Layer system. The base set of technologies identified above may be included in all of the systems to be discussed hereafter. In this instance, the focus is on the ability of the Physical Layer to accommodate the hostile mobile broadband channel.

Figure 7:
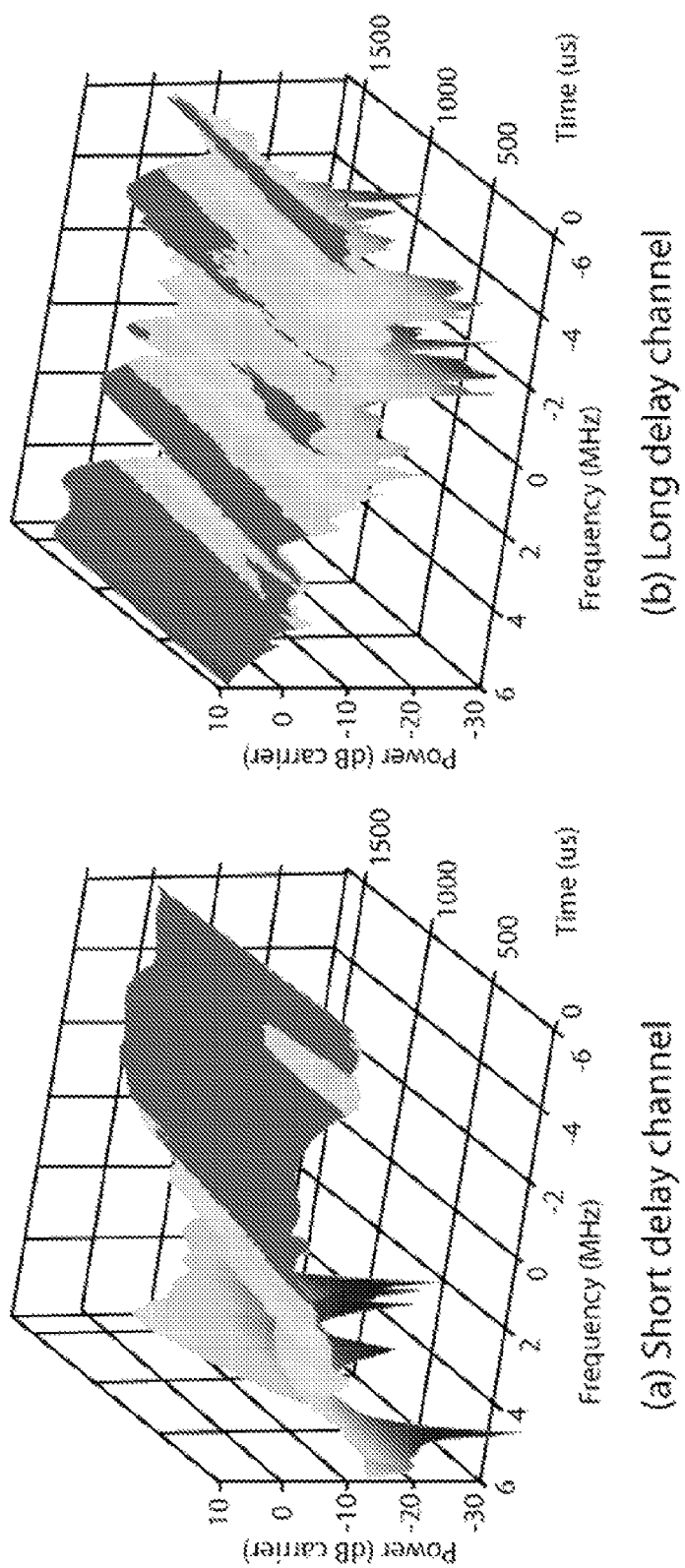
FIG. 7 illustrates actual captured channel measurements in a mobile channel at 60 mph.

Although OFDM is a popular modulation format for wireless broadband it has several aspects that require attention at both the transmitter and receiver. The cyclic prefix technique, briefly discussed above, provides effective recovery of energy from multipath radio channels. However, another significant impact of long delay spreads is the decreased coherence frequency, and consequential deep frequency selective fading of the radio channel. This, coupled with mobility, results in a hostile radio channel, as shown in FIGS. 6 and 7.

802.11a/g

Figure 9:
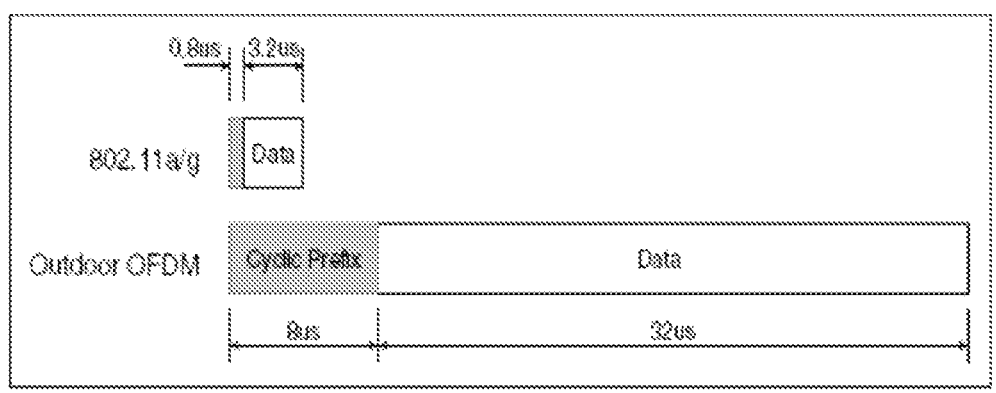
FIG. 9 illustrates OFDM symbol dimensions in accordance with the IEEE 802.11 standard.

The IEEE 802.11 a and g [5,6] standards describe a MAC and PHY suitable for indoor stationary propagation conditions. In the OFDM modes of 802.11 the cyclic prefix is 0.8~us long, as shown in FIG. 9. This is adequate for the delay spreads seen indoors but is significantly less than the delay spreads experienced outdoors. The low transmit powers of the equipment typically deployed indoors also limits reflection delays. When 802.11 equipment is used in an outdoor environment, and transmit powers are increased to the limits of regulation, the delay spreads experienced are much larger than the protection offered by the 0.8 us cyclic prefix. Large amounts of inter-OFDM symbol interference results and packet loss rates increase significantly. This interference could potentially be removed using equalization techniques at the receiver. In the following rare cases 802.11 may be suitable if near line of sight propagation conditions are available.

Highly directional antennas: These antennas reduce delay spread by limiting angle of arrival and departure. The use of highly directional antennas for mobile applications is clearly infeasible. Such structures are possible for fixed wireless backhaul but reduce the self healing capability of the system.

Small coverage areas per node: Keeping the transmit powers low reduces delay spread since the long delay paths disappear into the noise. The problem with this approach is the increased node density and handover frequency. Increased node density leads to increased cost. Increased handover frequency places additional strain on the network, as it is forced to adapt more rapidly to new routes to/from mobile nodes.

Given the narrow application scenarios for conventional 802.11 based systems, they may be unsuitable for deployment in urban private mobile broadband networks.

Outdoor OFDM

Figure 10:
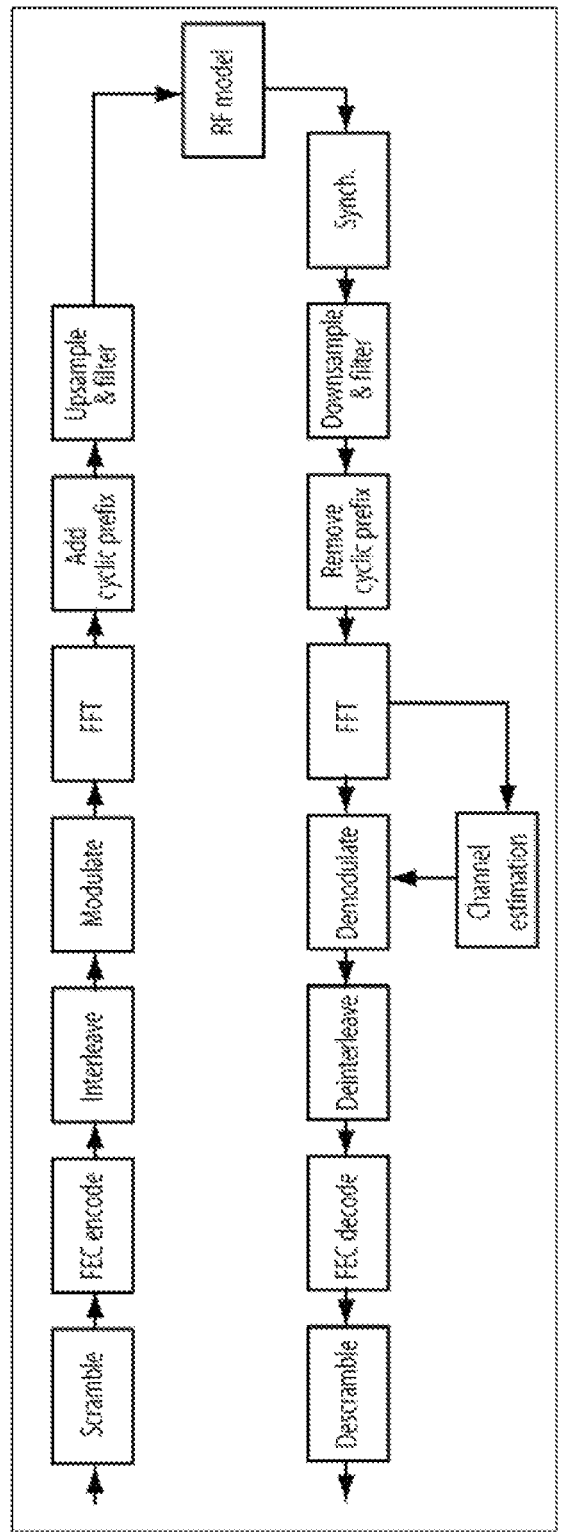
FIG. 10 illustrates a conventional OFDM Physical Layer system model.

The IEEE 802.11 standard specifies systems intended for use in indoor environments. This example focuses upon alternate OFDM based systems that were specifically designed for outdoor application. These standards are characterized by an increased cyclic prefix length, as shown in FIG. 9. This forces longer OFDM symbol durations in order to preserve spectral efficiency, since the cyclic prefix is typically discarded at the receiver. Examples of Outdoor OFDM Physical Layer standards are IEEE 802.16a [7] and 802.16e-2005 [8], and IEEE 802.20 [9], and EISI HiperMAN. These standards are mainly concerned with describing a compliant transmit waveform. The method for reception is left to the vendors. The canonical OFDM Physical Layer processing chain is shown in FIG. 10, and shall be referred to as the "conventional" receiver. The components associated with frame format recovery and detailed framing have been omitted. The receiver processing essentially inverts the transmitter. The front end Synch module implements time, frequency and amplitude synchronization. After down-sampling and cyclic prefix removal, the signal is converted to the frequency domain in blocks processed at the OFDM symbol frequency. In order to deliver high performance, coherent demodulation is then implemented, requiring accurate frequency domain channel estimation. De-interleaving and decoding (delivering frequency diversity) and descrambling then complete the Physical Layer processing.

Figure 11:
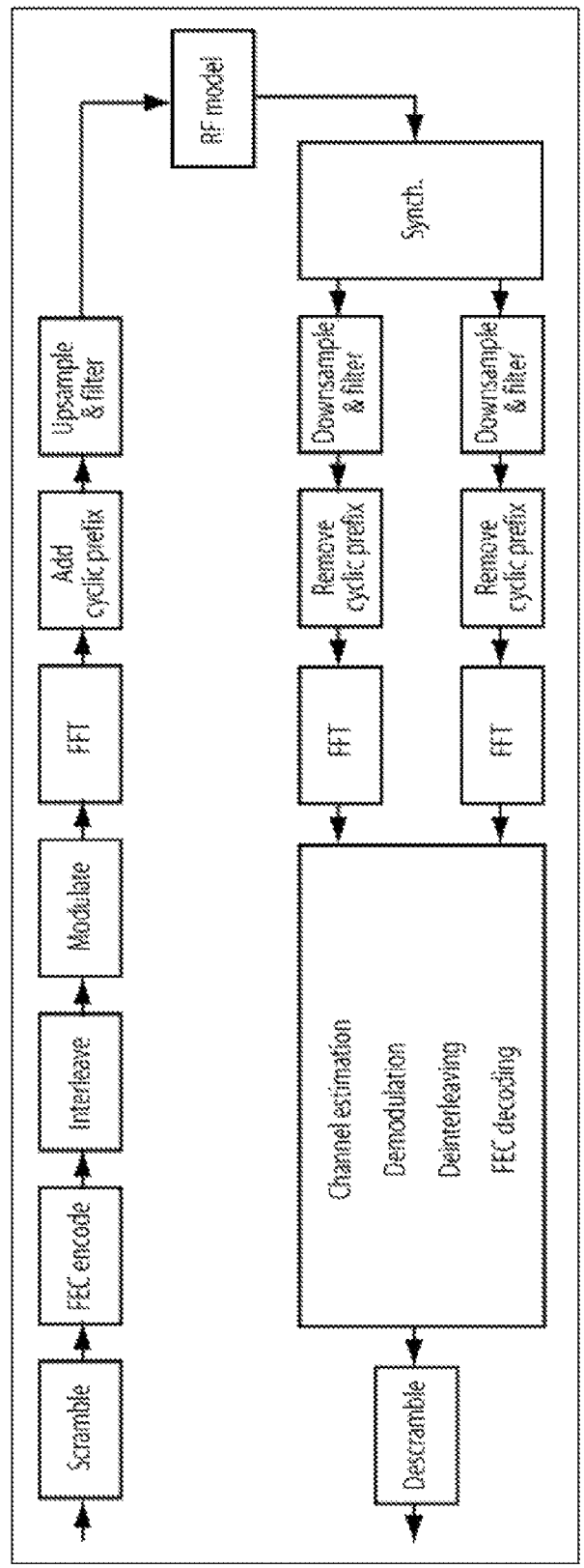
FIG. 11 illustrates a generalised OFDM Physical Layer system model using multiple antennae in accordance with a preferred embodiment of the present invention.
Figure 12:
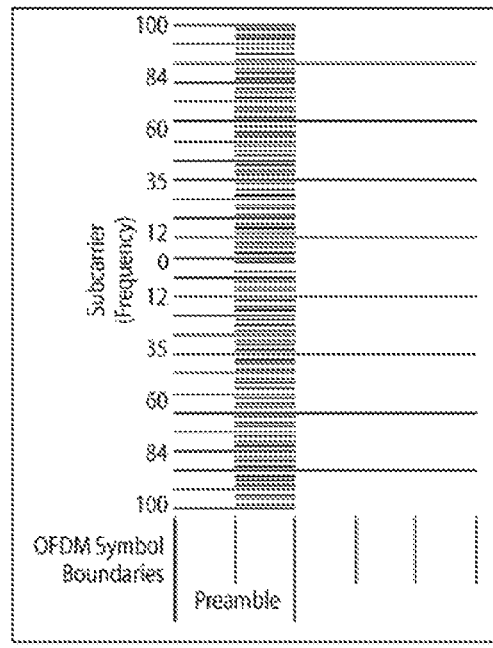
FIG. 12 illustrates a IEEE 812.16a OFDM downlink Pilot and Preamble structure.

In some cases selection diversity is employed but in order to exploit two or more antennas effectively, modifications to the conventional receiver are required. The model applicable for generalized frequency domain space-time receiver processing is shown in FIG. 11. In this model the demodulation and decoding of the signals from each antenna are integrated. Additionally, synchronization would typically involve a joint assessment of the signals arriving at each antenna. This structure may offer the potential for significant performance improvements over the conventional receiver. The frequency domain channel that each antenna path delivers to the receiver, at the FFT output, has been described above. In OFDM systems this frequency domain channel may describe the link between the input to the IFFT in the transmitter and the output of the FFT in the receiver. In order to effectively recover the transmitted information at the receiver, the frequency domain radio channel should be estimated. Certain assumptions are often made in receivers about the variation of the frequency domain channel. The variation of magnitude and phase in the frequency and time domains is considered. After an initial preamble, OFDM standards (e.g. IEEE 802.11a/g, IEEE 802.16a) prescribe use of pilot symbols, as shown in FIG. 12. These pilot symbols take the place of subcarriers that could otherwise be used for data carriage, hence resulting in a slightly degraded data rate.

Pilot Symbol Assisted Phase Estimation

When there is either mobility or multipath, but not both, it is possible to make the following assumptions.

Invariant power with time: The magnitude of each frequency may be different but remains invariant over time.

Constant variation of phase with time: Any phase change, with time, is the same for all frequencies.

An example of a radio channel operating under mobility in near LOS, with only small multipath effects, was shown in FIG. 4. Conversely, an example channel with strong multipath in a stationary environment was provided in FIG. 5. When these assumptions hold, conventional frequency offset estimation techniques will suffice, since high speed mobility in near LOS conditions is equivalent to a frequency offset. Even the most simple receivers require frequency offset estimation and correction, in order to combat differences in local oscillator frequencies. These assumptions do not hold in environments with even modest multipath and mobility. In these cases the phase change with time may not be the same for all frequencies. In addition, the magnitude may vary differently for different frequencies. Receivers that only employ phase tracking, after an initial magnitude and phase estimation, may fail.

Figure 13:
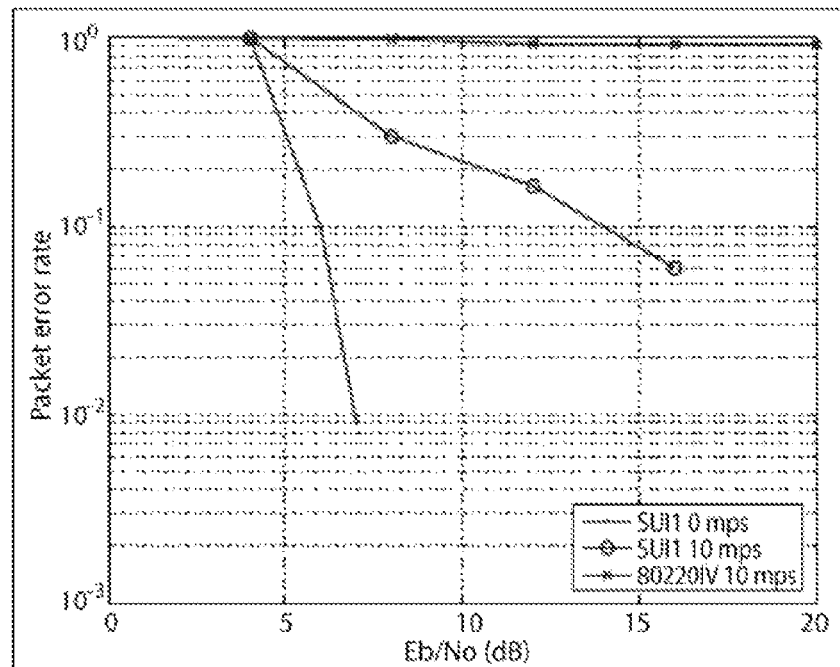
FIG. 13 is a chart illustration of packet error rate in accordance with conventional pilot assisted phase tracking.

Simulation results are presented for several Outdoor OFDM receivers, operating under combinations of mobility and/or clutter. Each plot shows how the packet error rate changes in the given environment, as the signal to noise ratio is varied. The level of clutter, and hence resulting multipath effects, is defined according to the channel model. The 802.20 (Case-IV) model is used to represent a typical urban environment [3]. The SUI1 [10] and Single models represent near LOS and full LOS respectively. The level of mobility is expressed in meters per second for each plot. FIG. 13 shows the performance of a receiver which makes an initial magnitude and phase estimate, based on a preamble, and then performs phase tracking for the remainder of the packet. Three curves are displayed, representing the LOS, near LOS, and urban cases. The LOS case is stationary, whereas the latter two cases model a mobile node moving at 20 mph. All curves are for the case of a single antenna at the transmitter and receiver. It is apparent that this technique fails when there is significant multipath or mobility. When multiple antennas are employed at the receiver this technique may be unsuitable since the variation of magnitude, that is ignored by this technique, causes the signals on the receive antennas to be incorrectly weighted. This incorrect combining of the signals results in significant degradation in receiver performance.

Pilot Symbol Assisted Channel Estimation

Figure 14:
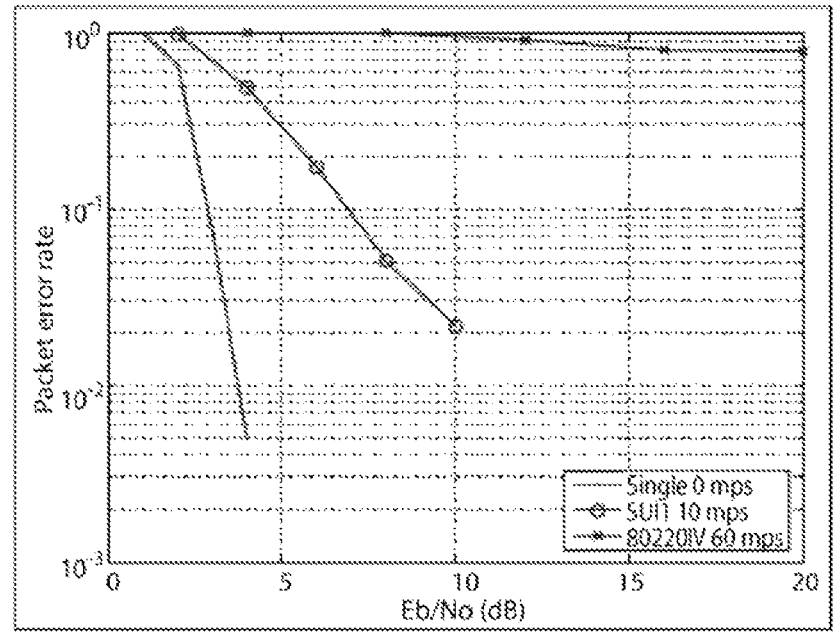
FIG. 14 is a further chart illustration of packet error rate in accordance with conventional pilot assisted channel tracking.

In this scenario it is assumed that the receiver is able to track both magnitude and phase as they vary across frequency and time, using pilot symbol assisted channel estimation. The preamble is employed to seed the channel estimation process and then, throughout the packet, pilots at fixed subcarriers are employed to update that channel estimate. In this experiment there is one pilot every 20 subcarriers. Note that in the 802.16a specification there is one pilot every 24 subcarriers. The performance of pilot symbol assisted channel estimation is shown in FIG. 14. As clutter and mobility increase, the coherence frequency of the channel becomes smaller than the pilot spacing. The conventional receiver may then no longer be able to track the channel, and packet failures may dominate. Additionally, at the limits of coverage where signals are weak the quality of the channel estimated from the preamble may be poor irrespective of any mobility.

Advanced Channel Estimation and Tracking

Figure 15:
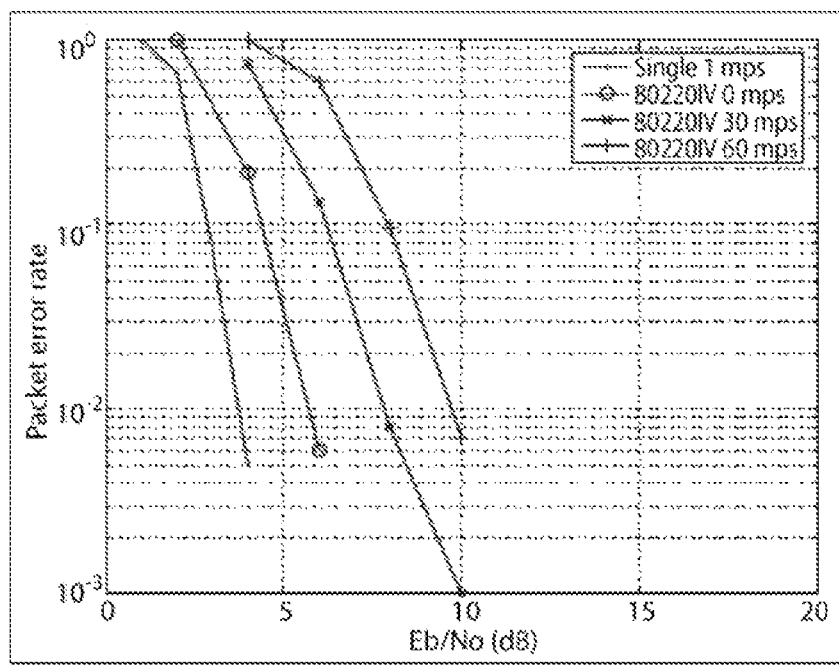
FIG. 15 illustrates a resultant packet error rate in accordance with embodiments of the present invention.

In this scenario it is assumed that the receiver is able to track both magnitude and phase, as they vary across frequency and time, to a very high degree of accuracy. The results presented in FIG. 15 are based on a technique implemented by the inventor that does not require any pilot symbols, other than those typically included in the packet preamble. With reference to FIG. 12, OFDM symbols beyond the first two OFDM symbols are void of pilots. This would ordinarily result in an inability of the receiver to track even modest changes in the radio channel during the reception of a packet. In this scenario it is assumed that the receiver is able to track both magnitude and phase as they vary across frequency and time to a very high degree of accuracy. Only through the use of advanced channel estimation and tracking is the support of genuine mobility in clutter provided. All other techniques fail even with moderate multipath or mobility. In all other cases the 802.20 Case-IV channel resulted in packet errors, even when the signal was received at high power. The advanced techniques analyzed here provide performance which displays only minimal loss with respect to the LOS case. The resulting receiver sensitivity gain over other channel tracking techniques is several tens of dB.

Case Study: Coverage with Real Time Constraints}

In the sections above, the performance of the Physical Layer has been assessed via Packet Error Rate simulations. In this example, the coverage afforded by 802.11g and the inventor's present networks is compared, through field trials in urban clutter. Of particular concern is the ability of the networks to provide coverage to vehicles in motion for network traffic with real-time constraints. The propagation environment reflects that typically encountered by network operators in metropolitan areas. The speed of the vehicle in this study varied between 0 and 50 mph and was 30 mph on average.

Traffic Profile

Each network was subjected to a constant bit rate stream of UDP/IP packets, each containing 850 Bytes of data. The rate of transmission was 5 packets per second.

Propagation Environment

The radio environment may be categorized as urban. Delay spreads of several microseconds have been measured. Most of the test region consists of 1-3 storey residences and 2-4 storey office blocks. The north eastern region consists of clear field line of sight conditions.

Physical Layer Parameters

The Physical Layer settings were configured to the advantage of the 802.11g system, as shown in Table 1, below.

TABLE 1

Coverage Test Physical Layer Parameters

| Parameter | 802.11g | Outdoor OFDM | Units |
|---|---|---|---|
| Tx Power | 2 | 2 | W |
| Cyclic Prefix Length | 0.8 | 8 | us |
| RF Bandwidth | 20 | 16 | MHz |
| Center Frequency | 2412 | 2460 | MHz |
| # Receive Antennas | 1 | 2 | |
| Data Rate | 6 | 10 | Mbps |

The 802.11g system is given a significant power per information bit advantage due to the increased RF bandwidth and lower data rate. The 802.11g equipment employs a state-of-the-art chipset from a market leading supplier.

Coverage Results

Figure 16:
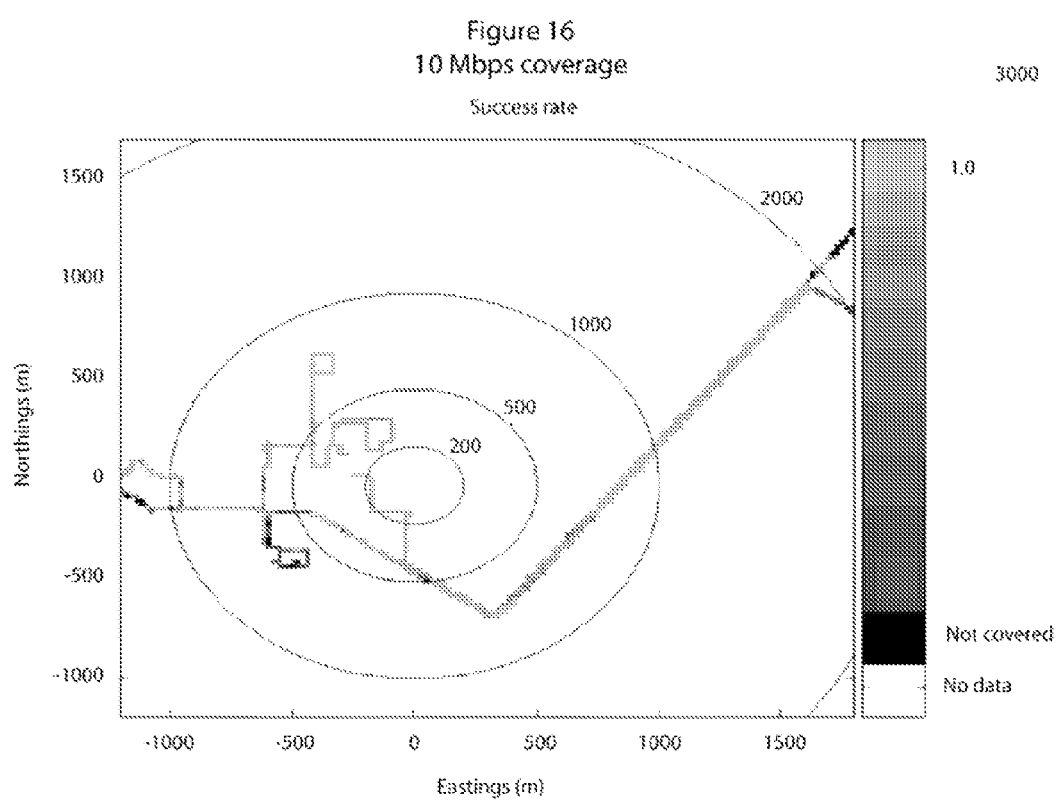
FIG. 16 illustrates exemplary coverage of a 10 Mbps wireless mobile communications system in accordance with a preferred embodiment of the present invention.
Figure 17:
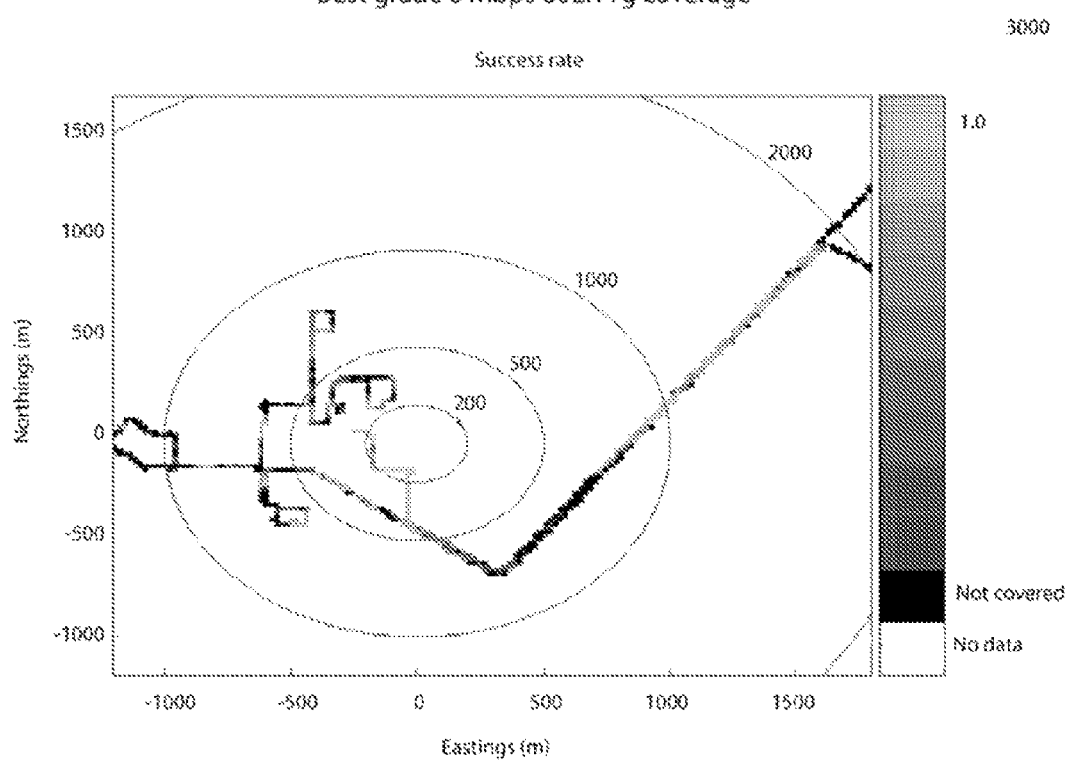
FIG. 17 illustrates exemplary coverage of a 6 Mbps wireless mobile communications system in accordance with a preferred embodiment of the present invention.

Uplink coverage plots for an example Outdoor OFDM system with advanced channel estimation in accordance with the present invention and two receive antennas, and for the 802.11 system are shown in FIGS. 16 and 17, respectively. These results were collected simultaneously in order to avoid different interference situations. The 802.11g equipment is only effective when there is a very strong line of sight component in the received signal. In contrast, the outdoor OFDM system in accordance with the present invention with its advanced channel tracking operates very effectively in clutter, at ranges up to and beyond 1 km. This is due to the effective use of two antennas, which is made possible by the accurate estimation of the radio channels to these antennas. An additional experiment involved fitting a video camera to the vehicle, with a live MPEG-4 video camera stream being sent from the vehicle to the fixed station. The 802.11g equipment provided a link for approximately 1 minute out of 20 minutes, whereas the Outdoor OFDM system of the embodiment of the present invention provided continuous coverage.

It has been shown that the outdoor mobile radio channel presents a difficult problem to designers of broadband wireless receivers. The particular combination of mobility and strong reflections presents the most stressful case, and yet is the most important for Public Safety end users. OFDM Physical Layer systems incorporating multiple antennas were studied in particular, and a technique that provides unprecedented performance levels in the most difficult situations was presented. Conventional receiver techniques applied to emerging standards, such as 802.16, were found wanting due to their inability to accurately track the hostile mobile radio channel. The benefits were further justified in fair field trails, where an MPEG-4 video uplink was transmitted back to a base. The state-of-the-art 802.11g system failed to provide coverage for more than 10% of the coverage area, while the nodes implemented by the present invention provided 100% coverage.

In one preferred embodiment, the present invention provides a method of tracking time varying channels in a wireless packet based communication network comprising the steps of:

tracking at least one channel parameter in the time domain in accordance with an auto regression algorithm.

Any one or, a combination of two or more parameters may be tracked in accordance with an auto regression algorithm.

In one example, the CEDB (Channel Estimate DataBase), in the receiver, tracks three parameters in the time domain using an auto regression. These may be 1/Complex Channel Amplitude (per subcarrier)
2/Phase offset per OFDM symbol
3/Noise Power
4/OFDM timing error/offset
5/Coherence time
6/Coherence frequency Preferably at least, complex channel amplitude, phase offset, and noise power are tracked.

Generally, a packet consists of a sequence of OFDM symbols in time.

The auto-regression algorithm retains a CEDB state. A CEDB state comprises estimates of complex channel amplitude, phase offset & noise power as noted above. This state is updated upon decoding of a received symbol by taking a fraction of the current raw estimate and adding that to a complementary fraction of the state. The current raw estimates are derived from the current received OFDM symbol and all (or a subset of) previous transmitted symbol estimates.

The phase offset (representing any low frequency residual frequency offset due to frequency correction errors and/or phase noise) is tracked separately and is used to rotate the CEDB state. The rotated state may then be combined with the new channel estimate.

Figure 19:
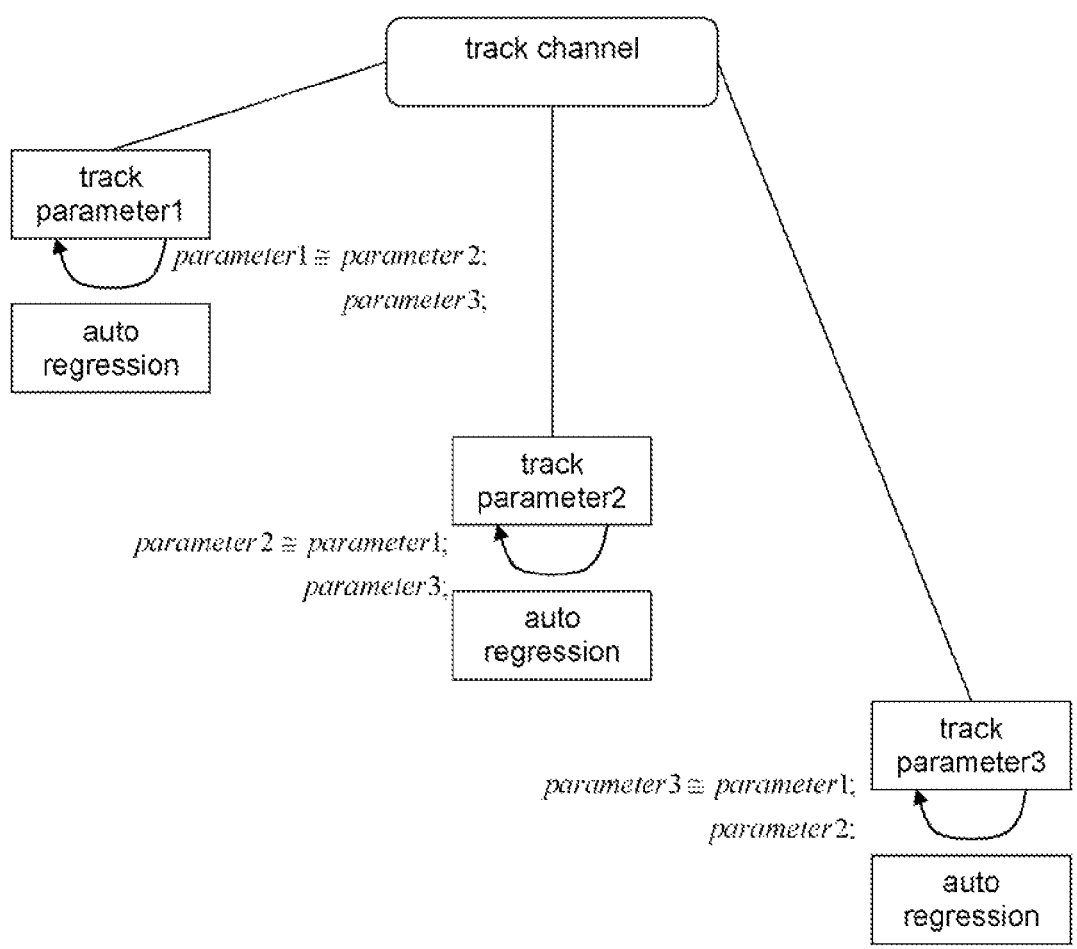
FIG. 19 is a flow chart illustrating a method of the present invention in accordance with a preferred embodiment.

With reference to FIG. 19, preferably, the complex channel amplitude is modelled as the sum of 3 effects, namely parameters 1, 2 & 4. This may be carried out as 3 separate components, rather than in related art techniques which are based on stationery theory/algorithms and thus cannot track three parameters which are varying over time due to the mobility constraints in the application environment of the present invention. In other words, it is considered that the related art systems cannot track parameters when used in a mobile environment. It has been found that improvements are found when the parameters are singularly tracked, rather than the conventional systems estimating the parameters all together. Typically these transmitted symbol estimates are derived from FEC decoder generated outcomes.

These fractions may change with OFDM sequence number and may be different for each parameter.

The CEDB generates a channel estimate for any received OFDM symbol to be decoded. In general the symbol to be decoded can be any previously received OFDM symbol.

The CEDB generates a channel estimate by predicting the channel based on the current state and the requested symbol number. The channel estimate is frequency smoothed using a bidirectional auto regression in the frequency domain. The regression factor is obtained from the CEDB and may change with OFDM symbol number and subcarrier.

In the case of multiple receive antennas a CEDB state is retained independently for each antenna. Each channel is estimated independently with antenna diversity exploited upon demodulation.

In another preferred embodiment, the present invention provides a method of tracking time varying channels in a wireless packet based communication network comprising the steps of:

providing a CEDB update function and a FEC decode function in accordance with a pipeline processing algorithm.

Figure 18:
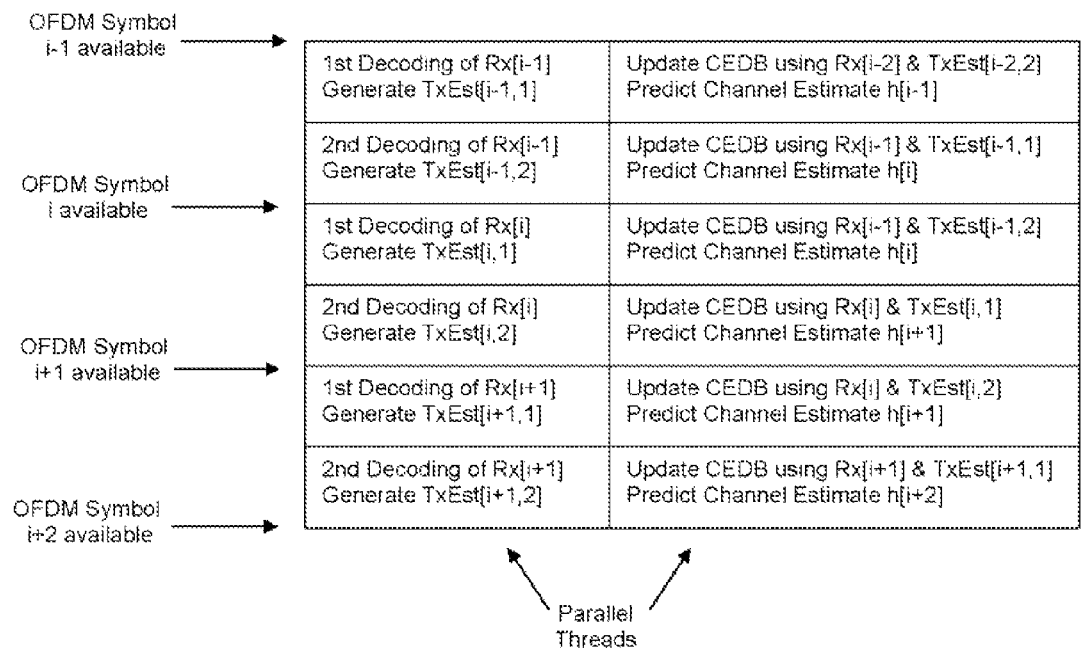
FIG. 18 is a flow chart illustrating a method of the present invention in accordance with another preferred embodiment.

With reference to FIG. 18, the pipeline processing algorithm may comprise the following steps:

providing a first decoding and use of a received symbol i while predicting a channel estimate for symbol i using a second decoding of symbol i−1;

providing a second decoding and use of symbol i while predicting a channel estimate for symbol i+1 using the first decoding of symbol i.

The processing speed of the receiver may be increased by pipelining of the CEDB update and FEC decode functions.

In a method of tracking time varying channels disclosed in WO 2005/11128, 2 iterations were performed and the iterative process was generally in accordance with the following steps:

1. predict a first channel estimate for symbol index i
2. decode symbol i
3. Use decoder outcomes from step 2 to update the CEDB state
4. Predict a second channel estimate for symbol index i
5. decode symbol i
6. Use decoder outcomes from step 5 state The present invention is an improvement over the above technique of WO 2005/11128. As shown above, the present invention now pipelines the CEDB update and decode functions for 2 iterations as follows.

1. providing a first decoding of a received symbol i while predicting a channel estimate for symbol i using a second decoding of symbol i−1;

2. providing a second decoding of symbol i while predicting a channel estimate for symbol i+1 using the first decoding of symbol i.

where using a decoding of symbol i means the updating of a Channel Estimate database using transmitted symbol estimates for symbol i that were derived by decoding symbol i. The Channel Estimate database is preferentially saved in the step of the first decoding but not in the step of the second decoding.

In accordance with this aspect of the present invention it is possible to start predicting a channel estimate for a next symbol before the first symbol has been (completely) decoded. A realisation of the algorithm employed in this embodiment is shown in the attached Appendix A and comprises a Matlab code listing used to test the algorithm.

In accordance with another embodiment the present invention provides a method of synchronizing packets arriving at a receiver in a wireless communication network the method comprising the steps of:

receive a sampled packet input signal;

determine a complex representation of the sampled input signal;

perform a delay and correlate calculation to form a first decision metric for a packet arrival time such that the correlation comprises a first arithmetic operation.

Figure 20:
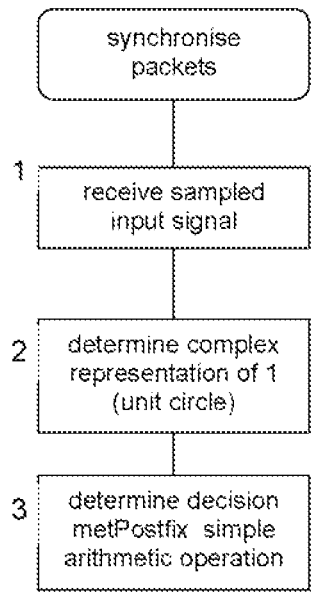
FIG. 20 a flow chart illustrating a method of the present invention in accordance with a further preferred embodiment.
Figure 21:
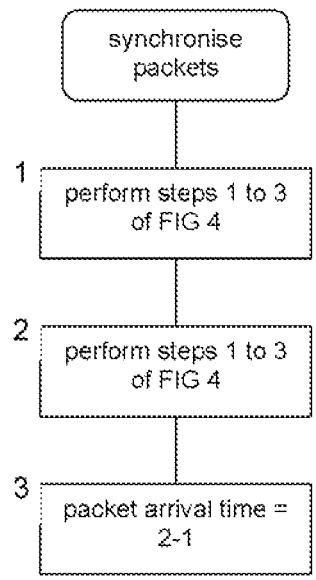
FIG. 21 is a flow chart illustrating a method of the present invention in accordance with another preferred embodiment.

With reference to FIG. 20, accordingly, a coarse synchronisation of a packet may be accomplished using a low complexity Delay and Correlate process based on projecting the received samples onto the complex unit circle, or equivalently determining the complex phase and discarding the amplitude information. The multiply stage of a conventional delay and correlate may then be replaced with a substantially simpler addition. Simple lookup tables may then be used prior to accumulating the metric. Complexity may therefore be reduced relative to conventional techniques. Normalisation is naturally provided by sending the received samples onto the complex unit circle. The resulting metric is inherently normalised. With reference to FIG. 21, robustness to large signal variations may be delivered. Robustness against Jammers and DC offset effects may be provided via a second parallel, shorter delay, delay and correlate process. The second delay and correlate metric may be subtracted from the first yielding a metric insensitive to similar signals, Jammers and DC offset effects.

Figure 22:
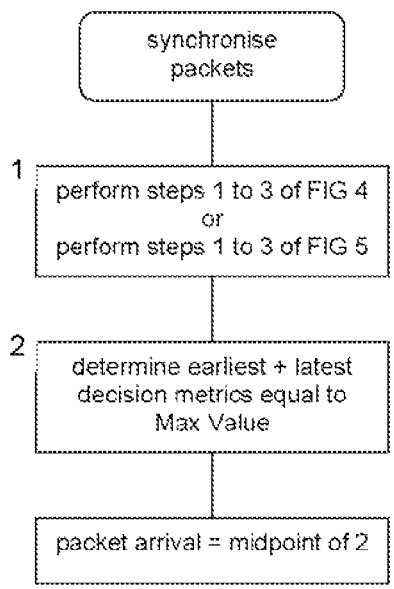
FIG. 22 is a flow chart illustrating a method of the present invention in accordance with another preferred embodiment.

With reference to FIG. 22, given a set of metrics that exceed a threshold, the timing instant may be determined by the following steps:

1/determining the earliest and latest times that are equal to the maximum, and

2/taking the midpoint of the earliest and latest times.

The midpoint of the two times is readily calculated using an add and a shift operation. The accuracy of the timing estimate may be improved reducing the performance requirements on the subsequent timing estimation algorithms. This is important because these subsequent algorithms are often of a complex nature and any complexity savings are therefore magnified. In typical examples the timing accuracy is improved by around 20 samples in a 4× oversampled case using IEEE 802.11 preambles.

Use of a second and parallel delay & correlate process tuned with a different delay allows the location of a plateau to determine 'timing', and return time in the middle of the plateau. If the required threshold is not exceeded, then a packet may be determined NOT to have arrived.

In accordance with another embodiment of the present invention there is provided a method of correlating a received signal in a wireless packet based communication network comprising the steps of:

quantising at least a first and a second signal component such that the signal components are represented by a first and second one bit reference, respectively;

performing correlation operations on the first and second one bit references.

In accordance with this embodiment, fine timing correlation may be implemented using a 1 bit quantised (test) reference and received signals. This solution stems from the realisation of trading correlation length for representation bit widths since it is more efficient to reduce the signal representation while increasing the correlation length.

Accordingly, the test signal and received signal I and Q arms may be quantised to one bit (sign info only) prior to correlation for the purpose of determining fine time synchronisation. The complex multiply required between the signals is then three valued (−,0,+) for I and three valued (−,0,+) for Q and may be efficiently implemented using low level logic gates. This embodiment has the added benefit of removing signal normalisation when threshold testing is required.

The resulting performance may be consistent with the optimal full complexity while the complexity is reduced by at least an order of magnitude. Another benefit is that the space needed to store the reference and received signal is reduced significantly.

In accordance with another embodiment of the present invention there is provided a method of communicating in a wireless packet based communication network comprising the steps of:

mixing a signal for transmission on the network into at least two distinct frequency bands so as to provide two transmission frequencies for the one signal.

Figure 23:
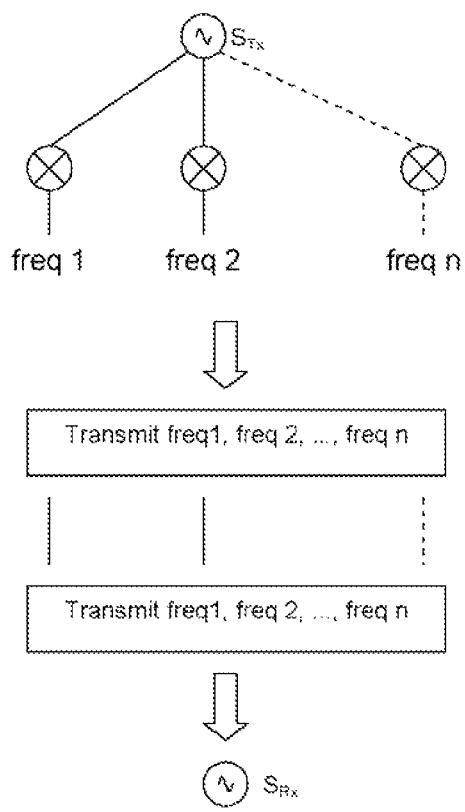
FIG. 23 is a schematic diagram of another preferred embodiment of the present invention.

There are potentially large levels of fading and interferer diversity offered by transmitting the same signal, for example, on two frequencies. The case of two frequencies (with a potential for n=2 or more) is described here with reference to FIG. 23.

There are performance gains to be had by transmitting with diversity offered by each one mixed up to a different frequency band. At the receiver two downconverters may be used. By independently downconverting the two signals and then jointly demodulating, a significant level of frequency and interferer diversity is afforded. It is to be understood that "joint demodulation" in the context of the present embodiment refers to a method whereby a vector channel model is defined with estimated statistics. Together these characterise the statistical dependence of the observations (i.e. symbols received on each antenna) on the transmitted symbol (i.e. symbol transmitted). The demodulation preferably employs channel estimates and noise power estimates obtained from a Channel Estimate database for each receiving antenna.

In one embodiment the two frequencies are transmitted on two antennae and received on separate antenna at the receiver. According to this embodiment, added advantage of space diversity is afforded.

In the preferred embodiment the transmitted baseband signal may be identical but in another embodiment the signal may be space time encoded with a matching space time decoder in operation at the receiver.

In accordance with another embodiment of the present invention there is provided a method of communication in a wireless OFDM multiple access packet based communication network comprising the step of:

providing a redundant cyclic data field for a transmitted data packet where the data field is a non-contiguous string distributed about a data packet.

Figure 24:
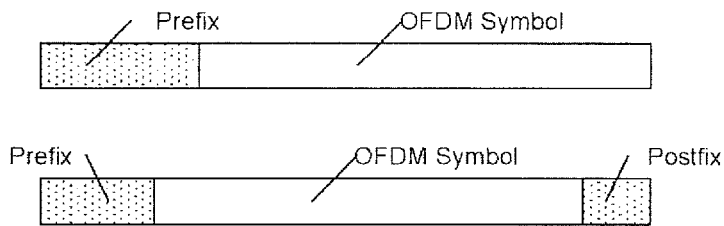
FIG. 24 is a schematic diagram of a prior art packet and a packet in accordance with another preferred embodiment of the present invention.

With reference to FIG. 24, preferably, the redundant cyclic data field comprises a prefix portion (Pre) placed at the head or front of a symbol, eg an OFDM symbol. A packet (Pkt) may comprise a number of such symbols. A suffix (Post) portion is placed at the tail or rear of a symbol. In this way, no time offset compensation is required at the receiver because, for example, the spreading effects act on a smaller portion or string of data.

In accordance with another embodiment of the present invention there is provided a method of managing digital data processing resources comprising the steps of:

providing an interpretive shell for communicating between an embedded system device and a remote PC wherein the interpretive shell reads user input data and interprets said user input data in the context of a programming language so as to interface digital instructions between the embedded system device and the remote PC to enable the remote PC to delegate a portion of the PC computing resources to the functions of the embedded system device.

In accordance with this embodiment, Debugging and development functionality may be split between development hardware and remote PC. The computing resources of the PC are made available for using in debugging and development, for example.

In the context of the present invention, an interpretive shell refers to a software program that reads lines of text which a user may type or enter and interprets them in the context of a given programming language. This allows, inter alia, scripting, interactive scripting and control of the embedded systems device, for example, modem prototype hardware, allowing more powerful and flexible debugging and to have a TCP/IP interface to low level hardware on target device via a register interface on the target CPU. As would be understood by the person skilled in the art, the term "embedded system device" refers to any number of electronic devices which may include an embedded system per se or, a component of an embedded system where, without limitation an embedded system may comprise a special-purpose computer system, which may be partially or completely encapsulated by the device it controls. Further, an embedded system may have specific requirements and may perform pre-defined tasks, unlike a general-purpose personal computer, PC.

The preferred interpretive shell is implemented using the open-source language "python" (Python is an interpreted, interactive, object-oriented programming language freely available from http://www.python.org/). With this implementation, it is possible to perform high level control in a more flexible and rapid development environment rather than writing, compiling and downloading, for example, embedded C.

Figure 25A:
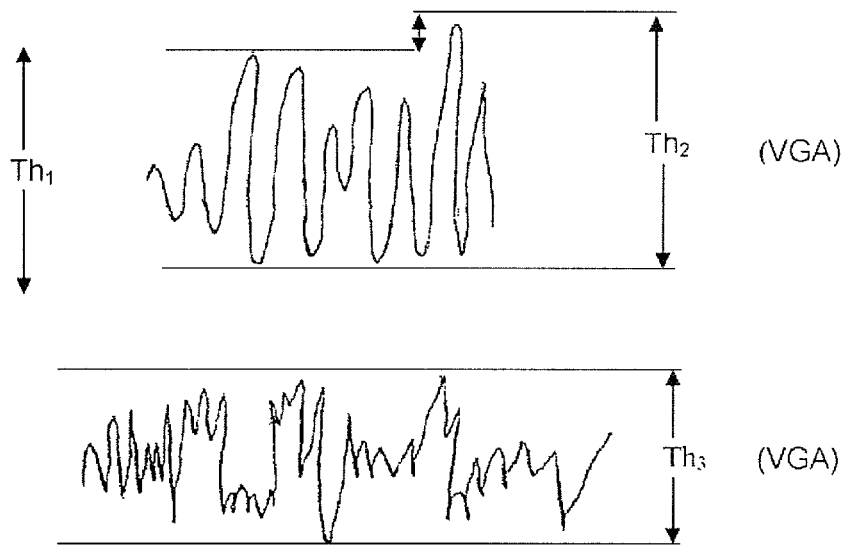
FIG. 25A is an illustration of a fluctuating received signal and a prior art method of receiving a signal.

Further to the problems discussed with respect to FIG. 25A, in a direct conversion RF receiver device the receive baseband signal experiences significant DC offset due to various processes internal to the RF receiver device. In such devices, a wide high-pass filter (WHPF) is often present that can be enabled to remove this DC offset so that baseband signal power measurement can be performed, however the width of the filter is usually such that it filters away a significant portion of the centre of the received signal, making it's use unsuitable when a burst is present on the channel.

It is typically recommended that when not receiving a signal, the RF receiver be operated in this WHPF mode, and that once a signal is detected (typically by separate RF signal power measure exceeding some threshold) the WHPF is switched off, returning the device to the DC-coupled mode. This change of mode induces large DC offsets in the I and Q baseband signals. Operating the modem and receiver in this way can result in significant distortion at the start of a received burst, and if the signal power is very low (in the case of weak signals) potentially for the entire burst.

In accordance with yet another embodiment of the present invention there is provided a method of receiving a signal transmitted in a wireless packet based communication network, the method comprising the steps of:
operating a receiver in a first mode;
monitoring received signal characteristics to determine whether the signal characteristics exceed a predetermined threshold condition;
switching the receiver to a second (preferably remedial action) mode if the predetermined threshold condition is exceeded.

Figure 25B:
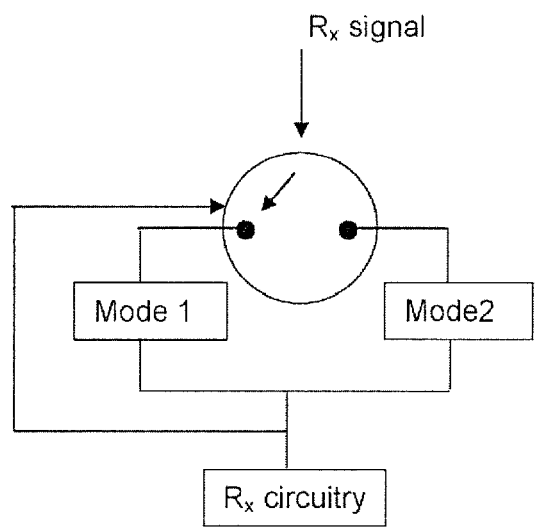
FIG. 25B is a schematic block diagram of a receiver system selectively operating in two modes in accordance with another preferred embodiment of the present invention.

Reference is now made to FIG. 25B schematically illustrating in block diagram form the selective operation of a receiver system in two modes to overcome the above described problems in a direct conversion RF receiver.

In one preferred embodiment the first mode is a substantially DC-coupled mode of operation and the second mode is a DC offset removal mode. Alternately, the first mode is a narrow band mode and the second mode is a wideband mode.

In a particular embodiment the receiver is locked in a given mode when it is determined that a packet is being received, preferably the first mode.

In practical examples, the invention according to this embodiment is directed to operating an RF receiver device in the DC-coupled mode, continually tracking the baseband DC offset and signal power, and only switching to the wide high-pass mode when baseband DC offsets become too large, or when adjustment of the RF path gains are required.

The present embodiment also provides a method of receiving a signal transmitted in a wireless packet based communication network, the method comprising the steps of:

operating the RF receiver device in DC (or close-to DC) coupled mode.

tracking the baseband DC offsets, and initiating DC offset removal strategies (in the RF device) if the magnitude of DC offset exceeds some threshold.

tracking the baseband signal power (with the effects of DC offset removed) and initiating RF signal path gain changes if the signal power falls outside of an upper and lower power limit.

concurrently estimating the DC offset and signal power in the baseband I/Q signals from the RF receiver device.

Preferably, the method further comprises the step of inhibiting the above mentioned changes in RF device state if the demodulator indicates that it is receiving a valid packet.

The present invention in one embodiment, continually make estimates of the DC offset present on the baseband I/Q signals, and concurrently, the baseband signal power. DC offset can cause large errors in the baseband signal power, so the signal power measurement should be adjusted to remove the effects of DC offset.

If the magnitude of the DC offset exceeds some threshold, then the RF receiver should be placed into a DC offset removal mode, and then returned to the DC-coupled mode.

If the baseband signal power is less than a lower power threshold, or is greater than an upper power threshold, then the RF signal path gain should be adjusted to return the baseband signal power to a nominated set-point within the upper and lower power thresholds. The RF gain adjustment process should ensure that the final setting of the RF gain is such that signals that result in a baseband power within the upper and lower power band limits will not result in compression within the RF receiver.

An agc-inhibit input to the process, which when inserted, prevents the abovementioned RF gain and DC-coupling mode changes. This input is asserted when the demodulator has detected and is receiving a valid burst, in order to avoid distortion of the received signal. However, in some situations, if the signal strength increases significantly (potentially due to an interfering signal which would prevent valid reception of the burst being received) it may be useful to cancel current burst reception, and re-enable the agc process.

Concurrent estimation of the DC offset and signal power over a block of symbols can be performed by: A) Averaging the I and Q signals to obtain an estimate of the DC offset. B) Averaging the magnitude squared of the I and Q signals, to produce a raw power estimate. C) Subtracting the effect of the DC offset from the raw power estimate to produce the true signal power estimate.

Subsequent removal and tracking of the DC offset from the baseband I and Q signals is required before its use in further stages of modem processing. This can be achieved by using a simple high-pass digital filter with a very narrow stop-band around DC. This filter should be re-seeded/initialised whenever a step change in the DC offset occurs (when disabling the WHPF mode).

It will be appreciated by those skilled in the art, that the invention is not restricted in its use to this particular application described, neither is the present invention restricted to its preferred embodiment with regards to the particular elements and/or features described or depicted herein. It will be appreciated that various modifications can be made without departing from the principles of the invention. Therefore, the invention should be understood to include all such modifications within its scope.

While this invention has been described in connection with specific embodiments thereof, it will be understood that it is capable of further modification(s). This application is intended to cover any variations uses or adaptations of the invention following in general, the principles of the invention and comprising such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

References

[1] A. Goldsmith, *Wireless Communications*. Cambridge University Press, 2005.
[2] ETSI, "Broadband radio access networks (BRAN); HIPERLAN type 2 technical specification; Physical (PHY) layer," August 1999.
[3] IEEE Working Group 802.20, "Channel models for IEEE 802.20 MBWA system simulations—Rev 03," November 2003.
[4] "Special issue on codes on graphs and iterative algorithms." *IEEE Trans. Inform. Theory*, Vol. 47, no. 2, February 2001.
[5] IEEE 802.11 WG. "IEEE Std 802.11a-1999(R2003). Part 11: Wireless LAN Medium Access Control (MAC) and Physical Layer (PHY) specifications High-speed Physical Layer in the 5 GHz Band."
[6] —, "IEEE Std 802.11g-2003. Part 11: Wireless LAN Medium Access Control (MAC) and Physical Layer (PHY) specifications, Amendment 4: Further Higher Data Rate Extension in the 2.4 GHz Band."
[7] IEEE 802.16 WG. "IEEE Std 802.16-2004, Part 16: Air Interface for Fixed Broadband Wireless Access Systems."
[8] —. "IEEE 802.16 Task Group e (Mobile Wireless-MAN)," [On-line]http://grouperieee.org/groups/802/16/tge/index.html.
[9] IEEE 802.20 WG, "IEEE 802.20 Mobile Broadband Wireless Access (MBWA)." [On-line]http://grouper.ieee.org/groups/802/20/.
[10] IEEE 802.16 WG, "Channel Models for Fixed Wireless Applications," [Online]http://grouper.ieee.org/groups/802/16/tg3/contrib/802163c-01_29r4.pdf.

The claims defining the invention are as follows:

1. A method of synchronizing packets arriving at a receiver in a wireless communication network, the method comprising:

receiving a sampled packet input signal at the receiver;
determining a complex representation of the sampled packet input signal without amplitude information;
performing a first delay and correlate calculation to form a first decision metric for a packet arrival time such that the first delay and correlate calculation comprises a first arithmetic operation;
performing a coarse synchronization based upon the first delay and correlate calculation and at least one lookup table operation;
performing a second delay and correlate calculation;
determining a difference between the first and second delay and correlate calculations to form a second decision metric for the packet arrival time;
accumulating a set of decision metrics such that each decision metric exceeds a threshold value;
determining earliest and latest decision metrics that are equal to a desired value; and
determining a packet arrival time corresponding to a midpoint between the earliest and latest decision metrics.

2. The method of claim 1 wherein the first arithmetic operation comprises an addition.

3. The method of claim 1 wherein the determining of the complex representation comprises a complex phase of the sampled packet input signal.

4. The method of claim 1 wherein the second delay and correlate calculation comprises a delay less than a corresponding delay of the first delay and correlate calculation.

5. A wireless device comprising:

a wireless transceiver; and
a controller cooperating with said wireless transceiver for synchronizing packets arriving from a wireless communication network, the synchronizing of the packets comprising
receiving a sampled packet input signal,
determining a complex representation of the sampled packet input signal without amplitude information,
performing a first delay and correlate calculation to form a first decision metric for a packet arrival time such that the first delay and correlate calculation comprises a first arithmetic operation,
performing a coarse synchronization based upon the first delay and correlate calculation and at least one lookup table operation,
performing a second delay and correlate calculation,
determining a difference between the first and second delay and correlate calculations to form a second decision metric for the packet arrival time,
accumulating a set of decision metrics such that each decision metric exceeds a threshold value;
determining earliest and latest decision metrics that are equal to a maximum value, and
determining a packet arrival time corresponding to a midpoint between the earliest and latest decision metrics.

6. The wireless device of claim 5 wherein the first arithmetic operation comprises an addition.

7. The wireless device of claim 5 wherein determining of the complex representation comprises a complex phase of the sampled packet input signal.

8. The wireless device of claim 5 wherein the second delay and correlate calculation comprises a delay less than a corresponding delay of the first delay and correlate calculation.

* * * * *